US012326689B2

(12) United States Patent
Kaku et al.

(10) Patent No.: US 12,326,689 B2
(45) Date of Patent: Jun. 10, 2025

(54) ELECTROPHOTOGRAPHIC APPARATUS

(71) Applicant: CANON KABUSHIKI KAISHA, Tokyo (JP)

(72) Inventors: Kenichi Kaku, Shizuoka (JP); Akihiro Maruyama, Shizuoka (JP); Shuhei Iwasaki, Kanagawa (JP); Tatsuya Yamaai, Kanagawa (JP); Kaname Watariguchi, Kanagawa (JP); Michiyo Sekiya, Shizuoka (JP); Kohei Makisumi, Shizuoka (JP); Hideharu Shimozawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 460 days.

(21) Appl. No.: 17/816,024

(22) Filed: Jul. 29, 2022

(65) Prior Publication Data

US 2023/0059041 A1 Feb. 23, 2023

(30) Foreign Application Priority Data

Aug. 6, 2021 (JP) ................................ 2021-130217

(51) Int. Cl.
*G03G 5/047* (2006.01)
*G03G 5/06* (2006.01)
(Continued)

(52) U.S. Cl.
CPC ........... *G03G 5/047* (2013.01); *G03G 5/0696* (2013.01); *G03G 5/144* (2013.01); *G03G 15/75* (2013.01)

(58) Field of Classification Search
CPC ...... G03G 5/047; G03G 5/0696; G03G 5/144; G03G 15/75
See application file for complete search history.

(56) References Cited

U.S. PATENT DOCUMENTS 4,882,257 A 11/1989 Maruyama
4,892,800 A 1/1990 Sugata
(Continued)

FOREIGN PATENT DOCUMENTS

JP 64-17066 A 1/1989
JP 1-177570 A 7/1989
(Continued)

OTHER PUBLICATIONS

English machine translation of the description of JP-2017227723-A (Year: 2017).*
(Continued)

*Primary Examiner* — Mark F. Huff
*Assistant Examiner* — Boone Alexander Evans
(74) *Attorney, Agent, or Firm* — VENABLE LLP

(57) ABSTRACT

Provided is an electrophotographic apparatus which uses a light emitting diode array as an exposure unit and exposes a photosensitive member to a quantity of light from the LED array whose average light quantity satisfies 0.8×E min or more and 1.1×E min or less on condition that a normalized radius of curvature R of a normalized graph derived from the E-V curve of the photosensitive member has a minimum value of 0.24 or less, and a light quantity at the minimum value of the normalized radius of curvature R is E min [μJ/$cm^2$]. This electrophotographic apparatus prevents both the occurrence of image unevenness due to light quantity variation among the elements of the LED array and the generation of ghost images due to a rest potential.

8 Claims, 4 Drawing Sheets

(51) Int. Cl.
*G03G 5/14* (2006.01)
*G03G 15/00* (2006.01)

(56) References Cited

U.S. PATENT DOCUMENTS

| | | | | |
|---|---|---|---|---|
| 4,898,799 | A * | 2/1990 | Fujimaki | C09B 67/0002 430/58.65 |
| 5,176,976 | A | 1/1993 | Kikuchi | |
| 5,352,552 | A | 10/1994 | Maruyama | |
| 5,385,797 | A | 1/1995 | Nagahara | |
| 5,391,446 | A | 2/1995 | Ohtani | |
| 5,391,449 | A | 2/1995 | Maruyama | |
| 5,422,210 | A | 6/1995 | Maruyama | |
| 5,455,135 | A | 10/1995 | Maruyama | |
| 5,484,673 | A | 1/1996 | Kikuchi | |
| 5,667,926 | A | 9/1997 | Maruyama | |
| 5,677,095 | A | 10/1997 | Kikuchi | |
| 5,693,443 | A | 12/1997 | Nakamura | |
| 5,729,801 | A | 3/1998 | Maruyama | |
| 5,879,847 | A | 3/1999 | Yoshinaga | |
| 5,888,690 | A | 3/1999 | Yoshinaga | |
| 5,890,037 | A | 3/1999 | Kukimoto | |
| 5,905,008 | A | 5/1999 | Yoshinaga | |
| 5,910,386 | A | 6/1999 | Yoshinaga | |
| 5,923,925 | A | 7/1999 | Nakamura | |
| 6,016,414 | A | 1/2000 | Anayama | |
| 6,110,628 | A | 8/2000 | Sekiya | |
| 6,180,303 | B1 | 1/2001 | Uematsu | |
| 6,372,397 | B1 | 4/2002 | Maruyama | |
| 6,376,695 | B1 | 4/2002 | Kushibiki | |
| 6,416,915 | B1 | 7/2002 | Kikuchi | |
| 6,436,597 | B2 | 8/2002 | Maruyama | |
| 6,664,014 | B1 | 12/2003 | Kikuchi | |
| 7,141,341 | B2 | 11/2006 | Sekido | |
| 7,175,706 | B2 | 2/2007 | Mizutani | |
| 7,187,890 | B2 | 3/2007 | Nishida | |
| 7,378,205 | B2 | 5/2008 | Sekiya | |
| 7,563,553 | B2 | 7/2009 | Kikuchi | |
| 7,585,604 | B2 | 9/2009 | Ogaki | |
| 7,910,274 | B2 | 3/2011 | Tanaka | |
| 7,927,774 | B2 | 4/2011 | Ogaki | |
| 8,343,699 | B2 | 1/2013 | Nagasaka | |
| 8,465,889 | B2 | 6/2013 | Sekido | |
| 8,524,430 | B2 | 9/2013 | Takagi | |
| 8,546,050 | B2 | 10/2013 | Maruyama | |
| 8,632,931 | B2 | 1/2014 | Sekido | |
| 8,783,209 | B2 | 7/2014 | Kaku | |
| 8,795,936 | B2 | 8/2014 | Sekido | |
| 8,841,052 | B2 | 9/2014 | Watariguchi | |
| 8,974,991 | B2 | 3/2015 | Kawahara | |
| 9,029,054 | B2 | 5/2015 | Okuda | |
| 9,034,545 | B2 | 5/2015 | Maruyama | |
| 9,063,505 | B2 | 6/2015 | Sekiya | |
| 9,068,083 | B2 | 6/2015 | Tanaka | |
| 9,069,267 | B2 | 6/2015 | Kaku | |
| 9,235,144 | B2 | 1/2016 | Yamamoto | |
| 9,274,442 | B2 | 3/2016 | Sato | |
| 9,280,071 | B2 | 3/2016 | Maruyama | |
| 9,436,106 | B2 | 9/2016 | Kuno | |
| 9,436,107 | B2 | 9/2016 | Murakami | |
| 9,459,542 | B2 | 10/2016 | Tanaka | |
| 9,500,966 | B2 | 11/2016 | Watariguchi | |
| 9,507,283 | B2 | 11/2016 | Maruyama | |
| 9,523,929 | B2 | 12/2016 | Nakamura | |
| 9,535,346 | B2 | 1/2017 | Sekiya | |
| 9,535,347 | B2 | 1/2017 | Watariguchi | |
| 9,563,139 | B2 | 2/2017 | Kawahara | |
| 9,599,917 | B2 | 3/2017 | Okuda | |
| 9,645,515 | B2 | 5/2017 | Kuno | |
| 9,645,516 | B2 | 5/2017 | Kawahara | |
| 9,651,879 | B2 | 5/2017 | Maruyama | |
| 9,726,992 | B2 | 8/2017 | Sakuma | |
| 9,760,030 | B2 | 9/2017 | Sekiya | |
| 9,772,568 | B2 | 9/2017 | Sekido | |
| 9,811,011 | B2 | 11/2017 | Nishi | |
| 9,851,648 | B2 | 12/2017 | Nishi | |
| 9,864,285 | B2 | 1/2018 | Nishi | |
| 9,869,032 | B2 | 1/2018 | Kawahara | |
| 9,921,498 | B2 | 3/2018 | Sekido | |
| 10,162,278 | B2 | 12/2018 | Kuno | |
| 10,203,617 | B2 | 2/2019 | Kuno | |
| 10,303,085 | B2 | 5/2019 | Sato | |
| 10,372,050 | B2 | 8/2019 | Nishi | |
| 10,416,581 | B2 | 9/2019 | Ito | |
| 10,452,021 | B2 | 10/2019 | Miura | |
| 10,539,892 | B2 | 1/2020 | Nishida | |
| 10,545,453 | B2 | 1/2020 | Iwasaki | |
| 10,558,132 | B2 | 2/2020 | Ishida | |
| 10,558,133 | B2 | 2/2020 | Nakamura | |
| 10,642,177 | B2 | 5/2020 | Nakamura | |
| 10,663,913 | B2 | 5/2020 | Yamaai | |
| 10,691,033 | B2 | 6/2020 | Nishida | |
| 10,747,130 | B2 | 8/2020 | Okuda | |
| 10,747,131 | B2 | 8/2020 | Watanabe | |
| 10,831,117 | B2 | 11/2020 | Sakakibara | |
| 10,831,118 | B2 | 11/2020 | Watanabe | |
| 10,838,315 | B2 | 11/2020 | Shimozawa | |
| 10,942,462 | B2 | 3/2021 | Ito | |
| 11,003,102 | B2 | 5/2021 | Ishiduka | |
| 11,112,719 | B2 | 9/2021 | Makisumi | |
| 11,126,097 | B2 | 9/2021 | Ishida | |
| 11,137,716 | B2 | 10/2021 | Hiyama | |
| 11,150,566 | B2 | 10/2021 | Iwasaki | |
| 11,181,837 | B2 | 11/2021 | Sekiya | |
| 11,237,493 | B2 | 2/2022 | Makisumi | |
| 11,249,407 | B2 | 2/2022 | Watariguchi | |
| 11,256,186 | B2 | 2/2022 | Shimozawa | |
| 11,340,553 | B2 | 5/2022 | Watariguchi | |
| 11,366,402 | B2 | 6/2022 | Ishiduka | |
| 11,392,050 | B2 | 7/2022 | Nishida | |
| 11,392,074 | B2 | 7/2022 | Ishida | |
| 2011/0217640 | A1* | 9/2011 | Hashiba | G03G 21/18 399/111 |
| 2014/0004450 | A1 | 1/2014 | Tokimitsu | |
| 2014/0141362 | A1 | 5/2014 | Watariguchi | |
| 2014/0154618 | A1 | 6/2014 | Maruyama | |
| 2015/0093693 | A1 | 4/2015 | Watariguchi | |
| 2015/0185630 | A1 | 7/2015 | Ito | |
| 2015/0346617 | A1 | 12/2015 | Kawahara | |
| 2015/0362847 | A1 | 12/2015 | Tanaka | |
| 2018/0095405 | A1* | 4/2018 | Iwai | G03G 21/1633 |
| 2018/0356759 | A1* | 12/2018 | Narita | G03G 15/043 |
| 2020/0064750 | A1* | 2/2020 | Sekido | G03G 5/144 |
| 2021/0325793 | A1 | 10/2021 | Nakamura | |
| 2021/0325794 | A1 | 10/2021 | Iwasaki | |

FOREIGN PATENT DOCUMENTS

| | | | |
|---|---|---|---|
| JP | 4-63373 | A | 2/1992 |
| JP | 8-160677 | A | 6/1996 |
| JP | 2000-315005 | A | 11/2000 |
| JP | 2001-125300 | A | 5/2001 |
| JP | 2002-67381 | A | 3/2002 |
| JP | 2005-141010 | A | 6/2005 |
| JP | 2006-267954 | A | 10/2006 |
| JP | 2011-180457 | A | 9/2011 |
| JP | 2017227723 | A * | 12/2017 |
| JP | 2002-40766 | A | 2/2022 |

OTHER PUBLICATIONS

U.S. Appl. No. 17/812,227, Michiyo Sekiya, Jul. 13, 2022.
U.S. Appl. No. 17/814,048, Kaname Watariguchi, Jul. 21, 2022.
U.S. Appl. No. 17/814,603, Hideharu Shimozawa, Jul. 25, 2022.
U.S. Appl. No. 17/814,655, Tatsuya Yamaai, Jul. 25, 2022.
U.S. Appl. No. 17/815,276, Akihiro Maruyama, Jul. 27, 2022.
U.S. Appl. No. 17/816,028, Kohei Makisumi, Jul. 29, 2022.
U.S. Appl. No. 17/936,088, Shuntaro Watanabe, Sep. 28, 2022.
U.S. Appl. No. 17/937,509, Nobuhiro Nakamura, Oct. 3, 2022.

* cited by examiner

ELECTROPHOTOGRAPHIC APPARATUS

BACKGROUND OF THE INVENTION

Field of the Invention

The present invention relates to an electrophotographic apparatus.

Description of the Related Art

In recent years, there has been a demand for electrophotographic apparatuses with higher image quality, and it is desirable to provide apparatuses that can maintain high stability in quality of images output under given external environments such as temperature and humidity and in repeated use.

In electrophotographic apparatuses using an electrophotographic photosensitive member (photosensitive member), such as photocopiers, laser beam printers, and facsimiles, an electrostatic latent image is formed by an image exposure unit, such as a laser scanner, on the photosensitive member uniformly charged. Then, the electrostatic latent image is developed with a toner to form a toner image on the photosensitive member. Thereafter, the toner image is transferred from the photosensitive member onto a transfer material, such a paper sheet, and the transferred toner image is fixed by heat, pressure, etc. to form an image.

For image forming with high image quality, an LED array, which is a collection of light emitting diode (hereinafter diode or LED) elements, is sometimes used as the image exposure unit. In the case of using an LED array, individual differences among the LED elements may cause unevenness in quantity of light for image exposure. It has been known that this causes unevenness in the electrostatic latent image formed on the surface of the electrophotographic photosensitive member (electrostatic latent image unevenness) in the process from the charging to the image exposure, which in turn causes image density unevenness and dot image unevenness (unevenness in the sizes and shapes of formed dots).

Japanese Patent Application Laid-Open No. 2000-315005 proposes the following as a method of remedying the unevenness in the surface potential of a photosensitive member caused by the light quantity unevenness due to the individual differences among LED elements and the dot image unevenness caused by the surface potential unevenness mentioned above. Specifically, Japanese Patent Application Laid-Open No. 2000-315005 proposes a method in which image forming is performed using an exposure dose in a rest potential region in the photosensitive member's light attenuation curve to reduce the image unevenness due to the variation in the quantity of light from the LED array. Note that the light attenuation curve is a curve obtained by measuring the potential at an exposed portion while sequentially varying the light quantity from a charge potential Vd, and is also called an E-V curve, an exposure dose-surface potential relationship, or the like. Also, the rest potential region refers to a region in the light attenuation curve where increasing the exposure dose does not greatly change the potential at the exposed portion.

However, a problem with performing image forming with an exposure dose in the rest potential region as described above is that a charge remains within the photosensitive member and a ghost image tends to be generated due to the residual charge.

Also, Japanese Patent Application Laid-Open No. 2001-125300 proposes using a light quantity in a linear region on a low light quantity region side of the above-mentioned E-V curve, or the light attenuation curve for the purpose of preventing generation of ghost images. However, simply reducing the light quantity during image forming makes it difficult to reduce the image unevenness resulting from the fluctuation in the quantity of light from the LED array as mentioned above.

That is, with conventional methods using a photosensitive member, it is difficult to remedy both the dot image unevenness caused by the LED array and the generation of ghost images.

As mentioned above, when an electrophotographic apparatus uses an LED array as an exposure unit, it often uses a light quantity in a rest potential region in its electrophotographic photosensitive member's light attenuation curve (a region where a change in exposure dose causes only a small change in light-portion potential) in order to reduce unevenness in light-portion potential, i.e., image unevenness, resulting from the light quantity variation due to the individual differences among the LED elements (Japanese Patent Application Laid-Open No. 2000-315005). However, in the case of using a light quantity in the rest potential region in the light attenuation curve, i.e., a high light quantity region, for image forming, there is a problem that a charge remaining within the photosensitive member induces a significant change in light attenuation characteristics such as a decrease in chargeability in the next and subsequent processes, which leads to generation of unintended images, i.e., ghost images.

Conversely, in the case of employing a latent image design with a low light quantity region in order to reduce the generation of ghost images (Japanese Patent Application Laid-Open No. 2001-125300), image unevenness occurs due to the light quantity variation resulting from the individual differences among the LED elements, as mentioned above.

An object of the present invention is to provide an electrophotographic apparatus using an LED array as an exposure unit and an electrophotographic photosensitive member exhibiting a characteristic light attenuation curve, specifically, having a light attenuation curve whose minimum value of radius of curvature is small, the electrophotographic apparatus being capable of performing image forming by generating a potential at an exposed portion of the photosensitive member with a light quantity corresponding to around an exposure dose indicating the smallest radius of curvature.

SUMMARY OF THE INVENTION

The above object is achieved by the present invention below.

Specifically, an electrophotographic apparatus according to the present invention includes:

- an electrophotographic photosensitive member that bears a toner image for forming an image on a recording material;
- a charging unit that electrically charges the electrophotographic photosensitive member; and
- an exposure unit that exposes a surface of the charged electrophotographic photosensitive member to light, wherein
- the exposure unit is a light emitting diode array including a plurality of light emitting diode elements, and wherein when a graph with a horizontal axis representing $I_{exp}$ and a vertical axis representing $V_{exp}$ obtained by repeating the following operations and measurement (1) to (4)

(1) setting a surface potential of the electrophotographic photosensitive member at 0 V, (2) charging the electrophotographic photosensitive member for 0.005 second so that an absolute value of the surface potential of the electrophotographic photosensitive member becomes 500 V, (3) exposing the charged electrophotographic photosensitive member to light having a wavelength of 805 nm and a light quantity of $I_{exp}$ [μJ/cm$^2$] 0.02 second after a start of the charging, and (4) determining the absolute value of the surface potential of the electrophotographic photosensitive member measured 0.06 second after the start of the charging as $V_{exp}$ [V]

at a temperature of 23.5° C. and a relative humidity of 50% RH while varying $I_{exp}$ from 0.000 μJ/cm$^2$ to 1.000 μJ/cm$^2$ at intervals of 0.001 μJ/cm$^2$ is normalized as a normalized graph with a horizontal axis x and a vertical axis y such that, with a light quantity at $V_{exp}$=250 V in the graph being $I_{1/2}$ [μJ/cm$^2$], a horizontal axis coordinate x corresponding to $I_{exp}=10 \cdot I_{1/2}$ [μJ/cm$^2$] is x=1, and a horizontal axis coordinate x corresponding to $I_{exp}$=0 [μJ/cm$^2$] is x=0, and a vertical axis coordinate y corresponding to $V_{exp}$=500 V is y=1 and a vertical axis coordinate y corresponding to $V_{exp}$ [V] at $I_{exp}=10 \cdot I_{1/2}$ [μJ/cm$^2$] is y=0, in the normalized graph, a minimum value of a normalized radius of curvature R calculated from the following Equation (E1) is 0.24 or less, $$R = \frac{\left[1+\left(\frac{dy}{dx}\right)^2\right]^{3/2}}{\left|\frac{d^2y}{dx^2}\right|}, \quad \text{(E1)}$$

and given that $I_{exp}$ corresponding to x at which the normalized radius of curvature R is the minimum value is E min [μJ/cm$^2$], the light emitting diode array is configured to expose the charged electrophotographic photosensitive member to a quantity of light whose average light quantity satisfies 0.8×E min or more and 1.1×E min or less.

Further features of the present invention will become apparent from the following description of exemplary embodiments with reference to the attached drawings.

DESCRIPTION OF THE EMBODIMENTS

Figure 1:
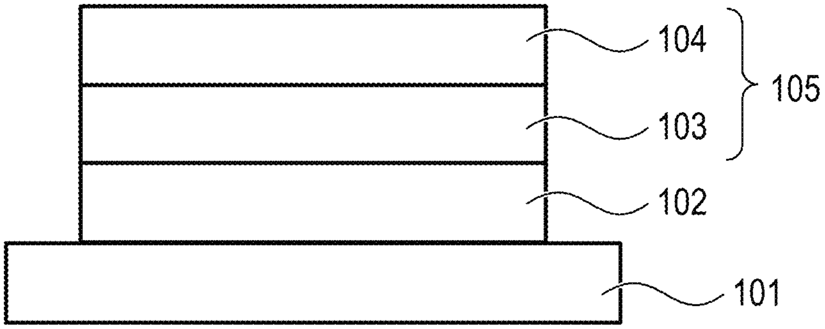
FIG. 1 is a diagram illustrating an example of the layer configuration of an electrophotographic photosensitive member according to the present invention.

The present invention will be described in detail below through a preferred embodiment.

An electrophotographic apparatus according to the present invention includes:

an electrophotographic photosensitive member that bears a toner image for forming an image on a recording material;

a charging unit that electrically charges the electrophotographic photosensitive member; and an exposure unit that exposes a surface of the charged electrophotographic photosensitive member to light, wherein the exposure unit is a light emitting diode array including a plurality of light emitting diode elements, and wherein when a graph with a horizontal axis representing $I_{exp}$ and a vertical axis representing $V_{exp}$ obtained by repeating the following operations and measurement (1) to (4)

(1) setting a surface potential of the electrophotographic photosensitive member at 0 V, (2) charging the electrophotographic photosensitive member for 0.005 second so that an absolute value of the surface potential of the electrophotographic photosensitive member becomes 500 V, (3) exposing the charged electrophotographic photosensitive member to light having a wavelength of 805 nm and a light quantity of $I_{exp}$ μJ/cm$^2$ 0.02 second after a start of the charging, and (4) determining the absolute value of the surface potential of the electrophotographic photosensitive member measured 0.06 second after the start of the charging as $V_{exp}$ [V]

at a temperature of 23.5° C. and a relative humidity of 50% RH while varying $I_{exp}$ from 0.000 μJ/cm$^2$ to 1.000 μJ/cm$^2$ at intervals of 0.001 μJ/cm$^2$ is normalized as a normalized graph with a horizontal axis x and a vertical axis y such that, with a light quantity at $V_{exp}$=250 V in the graph being $I_{1/2}$ [μJ/cm$^2$], a horizontal axis coordinate x corresponding to $I_{exp}=10 \cdot I_{1/2}$ [μJ/cm$^2$] is x=1, and a horizontal axis coordinate x corresponding to $I_{exp}$=0 [μJ/cm$^2$] is x=0, and a vertical axis coordinate y corresponding to $V_{exp}$=500 V is y=1 and a vertical axis coordinate y corresponding to $V_{exp}$ [V] at $I_{exp}=10 \cdot I_{1/2}$ [μJ/cm$^2$] is y=0, in the normalized graph, a minimum value of a normalized radius of curvature R calculated from the following Equation (E1) is 0.24 or less, $$R = \frac{\left[1+\left(\frac{dy}{dx}\right)^2\right]^{3/2}}{\left|\frac{d^2y}{dx^2}\right|}, \quad \text{(E1)}$$

and given that $I_{exp}$ corresponding to x at which the normalized radius of curvature R is the minimum value is E min

[μJ/cm$^2$], the light emitting diode array as the exposure unit is configured to expose the charged electrophotographic photosensitive member to a quantity of light whose average light quantity satisfies 0.8×E min or more and 1.1×E min or less.

The light emitting diode array (LED array) used in the present invention has a structure in which a plurality of chip-shaped light emitting diode elements (LED elements) are arranged in a row along the axial direction of the electrophotographic photosensitive member. The LED array may be formed by arranging a plurality of rows in series or parallel. Note that the LED elements (also referred to as light emitting points or light emitting elements) may be arranged two-dimensionally, in which case they may be arranged in a staggered pattern, for example. The driving of the LED array can be controlled by a driving circuit to scan a light beam according to image data.

The LED array is preferably such that the spot diameter of light to be applied from each LED element to the surface of the photosensitive member is relatively small. The size of each LED element forming the LED array is preferably in a range of from 20 μm to 100 μm and more preferably from 40 μm to 80 μm. If the spot diameter is less than 20 μm, the light quantity fluctuation among the LED elements mentioned as a problem herein tends to be large, so that image density unevenness and the like are likely to occur. Conversely, if the spot diameter is more than 100 μm, adjacent LED spots interfere with each other during irradiation, which makes the image forming difficult.

While a preferable range of wavelengths of light to be electrically emitted from the LED elements forming the LED array depends on the charge generation material contained in the photosensitive member to be described later, it is a range of from 400 nm to 900 nm, for example. The number of LED elements forming the LED array and their arrangement are not particularly limited as long as exposure to a desired light quantity at a desired resolution is achieved. For example, a configuration in which 256 light emitting diode elements are arranged in series and parallel at a density of 1600 dpi (dots per inch) is preferable.

In the present invention, the quantity of light to be applied by the LED array to the electrophotographic photosensitive member to form an electrostatic latent image means the average of the light quantities from the LED array. That is, in the present invention, the light quantity to be used in image forming mentioned above is selected to be within a predetermined range, and this light quantity refers to an average light quantity. The average light quantity from the LED array is defined as follows. Specifically, in the present invention, the average of the light quantities from the LED array is defined as the value of a light quantity calculated by sliding a light quantity measurement jig in the electrophotographic apparatus including the LED array and the photosensitive member in the longitudinal direction of the photosensitive member at 5 mm intervals to sequentially measure light quantities at 5 mm intervals from a position 5 mm away from the upper end of the photosensitive member to a position 5 mm away from its lower end, and averaging the measured measure light quantities.

In the present invention, an electrostatic latent image is formed on the electrophotographic photosensitive member by the LED array, and a toner is developed on the electrostatic latent image to form a toner image. Here, it is important to use an electrophotographic photosensitive member with which the quantity of light to be applied onto the electrophotographic photosensitive member from the LED array in the forming of the electrostatic latent image can be set within the following range. Specifically, it is necessary to form the image by exposing the photosensitive member to a light quantity satisfying 0.8×E min or more and 1.1×E min or less, where E min represents a light quantity in a graph with a horizontal axis x and a vertical axis y obtained by normalizing the photosensitive member's E-V curve at which the normalized radius of curvature represented by Equation (E1) above is the minimum value.

Generally, in the case where an LED array manufactured in a usual way is caused to electrically operate to form a latent image with an exposure dose in a region of less than 0.8 times E min, light quantity fluctuation is likely to occur among the light emitting elements of the LED array. In the present invention, the average light quantity from the LED array is used as the exposure dose for a latent image to form the image. Here, if each element is assumed to form one dot, the light-portion potential (VI) in the exposure region will be different for each one dot due to the light quantity fluctuation among the elements. This will result in differences in size and density between one-dot images, and thus cause image unevenness.

On the other hand, the exposure dose may be set to be high for the purpose of remedying the above dot image fluctuation among the individual LED elements. This can suppress the density fluctuation among the one-dot images. Here, if an image is formed with a light quantity above 1.1 times E min, the image forming is performed in the region VI, which is called "rest potential" in potential-exposure curves. Thus, a charge generated by exposure tends to stay in a photosensitive layer, in many cases, in a charge generation layer, and a ghost image problem is likely to occur.

Due to the above reasons, it is important to determine the light quantity E min corresponding to the minimum value of the normalized radius of curvature R obtained from the normalized graph and control the exposure dose in image forming with a light quantity satisfying 0.8×E min or more and 1.1×E min or less. It is more preferable to control the exposure dose with a light quantity satisfying 0.9×E min or more and 1.0×E min or less.

Also, in the electrophotographic apparatus of the present invention, the minimum value of the normalized radius of curvature R defined by Equation (E1) is 0.24 or less. When the minimum value of the normalized radius of curvature R is large, it is considered to represent a state of having failed to linearly drop the light-portion potential on the photosensitive member relative to the light quantity for latent image exposure, i.e., a state where the charge generated within the photosensitive member is staying within the photosensitive layer and the surface charge has not been eliminated. In this respect, it is more ideal for the minimum value of the normalized radius of curvature R to be small for the electrophotographic apparatus and the electrophotographic photosensitive member used in it. In particular, in the case of utilizing them in combination with an LED array as with the present invention, setting the minimum value of the normalized radius of curvature R at 0.24 or less can address both ghost images and the image density unevenness due to the light quantity unevenness of the LED array, which tend to be problems with electrophotographic apparatuses using an LED array. Also, the minimum value of the normalized radius of curvature R is more preferably 0.21 or less.

Measurement of E-V Curve

In the present invention, the $I_{exp}$-$V_{exp}$ graph (E-V curve) is defined as follows. Note that, in the art of the present invention, there is a case where an E-V curve is measured in a laser beam printer under specific process conditions. On the other hand, in the present invention, the E-V curve is not measured in the printer but is measured only with the photosensitive member under the following conditions.

Specifically, the E-V curve in the present invention refers to a graph with a horizontal axis representing $I_{exp}$ and a vertical axis representing $V_{exp}$ obtained by repeating the following operations and measurement (1) to (4)

(1) setting a surface potential of the electrophotographic photosensitive member at 0 V, (2) charging the electrophotographic photosensitive member for 0.005 second so that an absolute value of the surface potential of the electrophotographic photosensitive member becomes 500 V, (3) exposing the charged electrophotographic photosensitive member to light having a wavelength of 805 nm and a light quantity of $I_{exp}$ [μJ/cm$^2$] 0.02 second after a start of the charging, and (4) determining the absolute value of the surface potential of the electrophotographic photosensitive member measured 0.06 second after the start of the charging as $V_{exp}$ [V]

at a temperature of 23.5° C. and a relative humidity of 50% RH with $I_{exp}$ varied from 0.000 μJ/cm$^2$ to 1.000 μJ/cm$^2$ at intervals of 0.001 μJ/cm$^2$.

A specific example for measuring the E-V curve in the present invention will be described. Note that, as long as the above measurement can be performed, the actual measurement is not limited to this example.

Quartz glass is prepared whose entire surface is made transparent by optical polishing followed by vapor deposition of transparent ITO electrodes for the surface to have a sheet resistance of 1,000 Ω/sq or less (hereinafter referred to as "NESA glass"). The surface of the photosensitive member is brought into intimate contact with this NESA glass. At this time, glycerin is interposed between the NESA glass and the photosensitive member to ensure the intimate contact. Note that flat and smooth NESA glass is used in the case where the photosensitive member is in a flat plate shape, and curved NESA glass is used in the case where the photosensitive member is in a cylindrical shape. In this state, a voltage is applied to the NESA glass. This can charge the surface of the photosensitive member. Moreover, the surface of the photosensitive member is exposed by applying planar light having a wavelength of 805 nm and an intensity of 25 mW/cm$^2$ from the lower surface of the NESA glass. This can optically attenuate the surface potential.

By using the above measurement system, it is possible to irradiate the photosensitive member with light with 25 mW/cm$^2$ once for a short period of time, and also to repeat charging and exposure at faster cycles than the process speeds of electrophotographic apparatuses in recent years or of electrophotographic apparatuses expected in the future. Light with 25 mW/cm$^2$ is stronger than exposure light applied to the photosensitive members of electrophotographic apparatuses in recent years or of electrophotographic apparatuses expected in the future. Hence, a large amount of light quantity data can be stably and easily obtained at 0.001 μJ/cm$^2$ intervals to obtain the E-V curve ($I_{exp}$-$V_{exp}$) defined in the present invention. At the same time, with the above measurement method implemented by using this measurement system, it is possible to evaluate characteristics of the photosensitive member even if the process speed becomes higher and the exposure irradiation time becomes shorter in some years ahead or in the farther future. Even if the number of exposure operations decreases in response to a change in exposure method from a method using a laser-scan optical system to a method using an LED array, it is also possible to handle the decrease and evaluate characteristics of the photosensitive member. In particular, the light irradiation condition of using an intensity of 25 mW/cm$^2$ to perform exposure once for a short period of time can be considered an E-V curve measurement method with a sufficient margin for the future even with reciprocal law failure characteristics of the photosensitive member taken into account.

Normalized Graph

In the present invention, the E-V graph is normalized. Specifically, the graph is normalized such that, given that the light quantity at $V_{exp}$=250 V in the graph is $I_{1/2}$ [μJ/cm$^2$], a normalized light quantity after normalizing the horizontal axis $I_{exp}$ such that $10 \cdot I_{1/2}$ is 1 is x, a normalized surface potential after normalizing the vertical axis $V_{exp}$ such that a value of 500 Von the vertical axis of the graph is 1 is y, and y at $x=10 \cdot I_{1/2}$ is 0. The graph thus normalized will be referred to as the normalized graph. A radius of curvature of a graph with a horizontal axis x and a vertical axis y calculated from Equation (E1) below can be applied to the normalized graph. A radius of curvature derived with the normalized graph will be referred to as a normalized radius of curvature.

$$R = \frac{\left[1 + \left(\frac{dy}{dx}\right)^2\right]^{3/2}}{\left|\frac{d^2y}{dx^2}\right|} \quad \text{(E1)}$$

Figure 3:
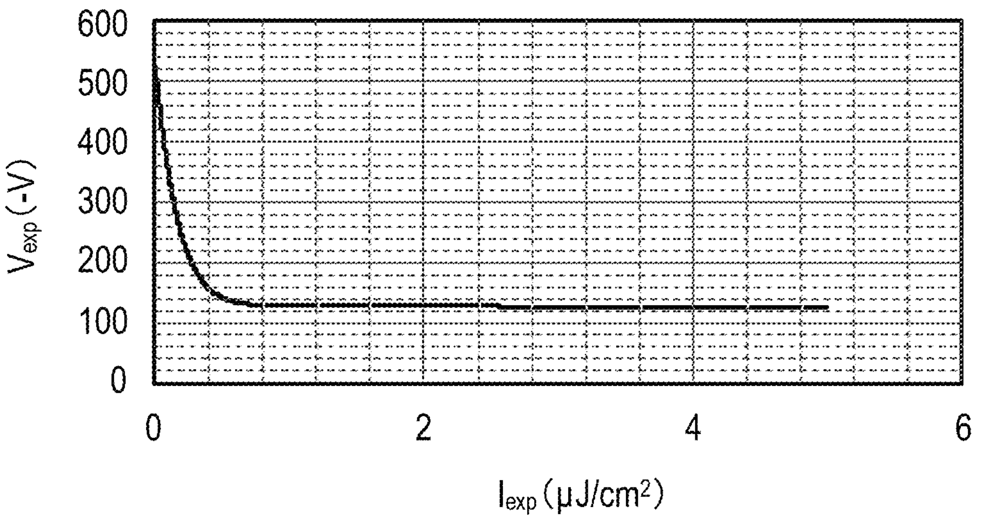
FIG. 3 is a typical example of graphical representation of $V_{exp}$ and $I_{exp}$ measured with a photosensitive member.
Figure 4:
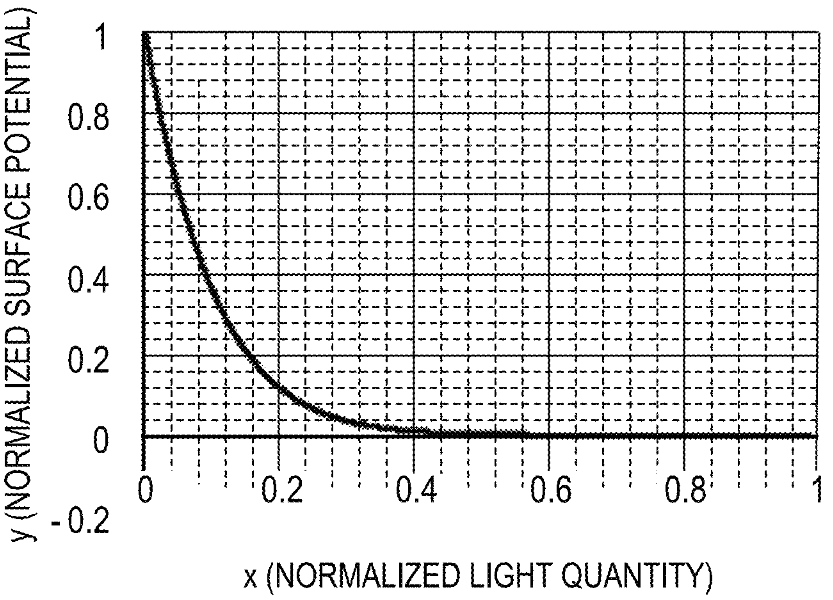
FIG. 4 is a normalized version of the graph of FIG. 3 (normalized graph).
Figure 5:
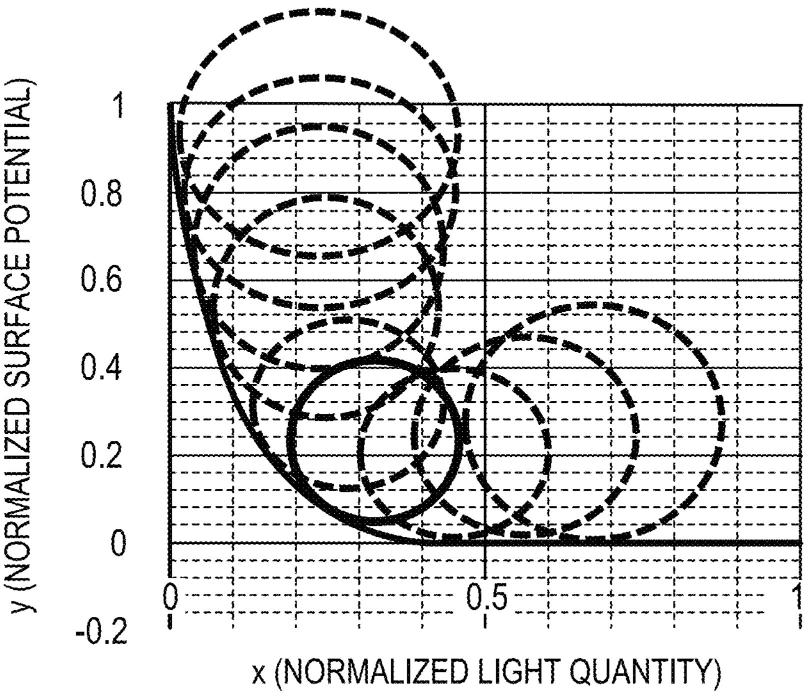
FIG. 5 is a diagram illustrating normalized radii of curvature of the normalized graph of FIG. 4.
Figure 6:
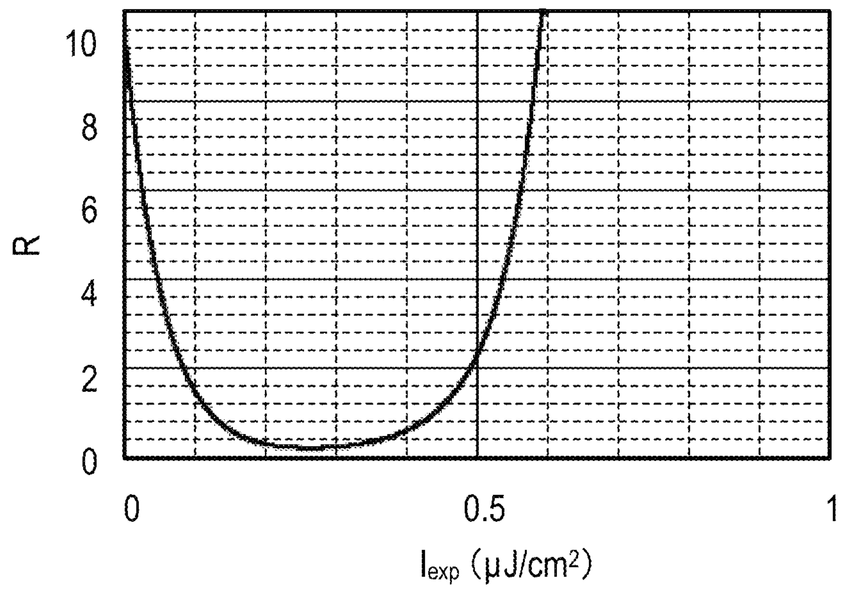
FIG. 6 is a graph illustrating the relationship between light quantity and normalized radius of curvature with a photosensitive member.

FIG. 3 illustrates an example of graphical representation of $V_{exp}$ and $I_{exp}$ measured with a photosensitive member. FIG. 4 illustrates a normalized version of this graph. FIG. 5 is a diagram depicting circles tangent to the normalized graph of FIG. 4. In FIG. 5, the radius of each circle depicted with a dotted line or a solid line is a normalized radius of curvature of this normalized graph. The radius of the circle depicted with the solid line in FIG. 5 represents the smallest normalized radius of curvature R. The smaller the minimum value of the normalized radius of curvature R, the sharper the E-V bend of the curve in the normalized graph. FIG. 6 is a graph illustrating the relationship between light quantity and normalized radius of curvature with the above photosensitive member.

Electrophotographic Photosensitive Member

The electrophotographic photosensitive member, which is also referred to simply as "photosensitive member", is used to bear a toner image for forming an image on a recording material. The electrophotographic photosensitive member in the present invention has a support and a photosensitive layer. It is preferably an electrophotographic photosensitive member having a support, an undercoat layer, and a photosensitive layer, and more preferably an electrophotographic photosensitive member having a support, an undercoat layer, a charge generation layer, and a charge transport layer containing a charge transport substance in this order. FIG. 1 is a diagram illustrating an example of th layer configuration of an electrophotographic photosensitive member. In FIG. 1, reference sign 101 denotes a support, reference sign 102 denotes an undercoat layer, reference sign 103 denotes a charge generation layer, reference sign 104 denotes a charge transport layer, and reference sign 105 denotes a photosensitive layer (laminated photosensitive layer). A specific example of an electrophotographic photosensitive member having a laminated photosensitive layer will be discussed first.

<Support>

In the present invention, the support is preferably an electroconductive support having electroconductive properties. Examples of the electroconductive support include supports made of a metal such as aluminum, iron, nickel, copper, or gold or an alloy thereof, and insulating supports made of a polyester resin, a polycarbonate resin, a polyimide resin, or glass on which is formed a thin film of a metal such as aluminum, chromium, silver, or gold, a thin film of an electroconductive material such as indium oxide, tin oxide, or zinc oxide, or a thin film of an electroconductive ink with silver nanowires added therein.

The surface of the support may be subjected to an electrochemical treatment such as anodization, wet honing, blasting, or the like in order to improve electrical characteristics and suppress interference fringes. Examples of the shape of the support include a cylindrical shape, a film shape, and so on.

The support may be used after performing a cutting process on its surface. In particular, in the case of using aluminum as the material, a cutting process may be performed on the surface to form a support for the photosensitive member, in order to remove burrs formed in a manufacturing process and improve the mechanical accuracy of the electroconductive support.

<Electroconductive Layer>

In the present invention, an electroconductive layer may be provided on the support. Providing an electroconductive layer can cover irregularities and defects on the support and prevent interference fringes. The average film thickness of the electroconductive layer is preferably 5 μm or more and 40 μm or less and more preferably 10 μm or more and 30 μm or less.

The electroconductive layer preferably contains electroconductive particles and a binding resin. Examples of the electroconductive particles include carbon black, particles of a metal, particles of a metal oxide, and so on. Examples of the metal oxide include zinc oxide, aluminum oxide, indium oxide, silicon oxide, zirconium oxide, tin oxide, titanium oxide, magnesium oxide, antimony oxide, bismuth oxide, and so on. Examples of the metal include aluminum, nickel, iron, nichrome, copper, zinc, silver, and so on.

Of these, it is preferable use a metal oxide as the electroconductive particles, and more preferable to use titanium oxide, tin oxide, or zinc oxide in particular.

In the case of using a metal oxide for the electroconductive particles, the surface of the metal oxide may be treated with a silane coupling agent or the like, or the metal oxide may be doped with an element such as phosphorus or aluminum or its oxide. Examples of the element or its oxide with which the metal oxide may be doped include phosphorus, aluminum, niobium, tantalum, and so on.

Also, the electroconductive particles may each have a laminate configuration having a core particle and a cover layer covering this particle. Examples of the material of the core particle include titanium oxide, barium sulfate, zinc oxide, and so on. Examples of the material of the cover layer include metal oxides such as tin oxide and titanium oxide.

Also, in the case of using a metal oxide for the electroconductive particles, their volume-average particle size is preferably 1 nm or more and 500 nm or less and more preferably 3 nm or more and 400 nm or less.

Examples of the resin include a polyester resin, polycarbonate resin, polyvinyl acetal resin, acrylic resin, silicone resin, epoxy resin, melamine resin, polyurethane resin, phenol resin, alkyd resin, and so on.

Also, the electroconductive layer may further contain a masking agent such as a silicone oil, resin particles, or titanium oxide, and so on.

The average film thickness of the electroconductive layer is preferably 1 μm or more and 50 μm or less and particularly preferably 3 μm or more and 40 μm or less.

The electroconductive layer can be formed by preparing an electroconductive-layer coating liquid containing the above materials and a solvent, forming a coating film of this coating liquid on the underlying layer or the support, and drying the coating film. Examples of the solvent used in the coating liquid include an alcohol-based solvent, sulfoxide-based solvent, ketone-based solvent, ether-based solvent, ester-based solvent, aromatic hydrocarbon-based solvent, and so on. Examples of a method of dispersing the electroconductive particles in the electroconductive-layer coating liquid include methods using a paint shaker, a sand mill, a ball mill, or a liquid collision-type high-speed dispersing machine.

Also, the surface of the support may be anodized in an acidic liquid containing an oxidant, and the resultant surface may be used as an electroconductive layer. In this case, for example, an inorganic acid such as sulfuric acid or chromic acid or an organic acid such as oxalic acid or sulfonic acid can be used as an electrolyte solution in the anodization process. Conditions such as the voltage to be applied, current density, process temperature, and time can be selected according to the kind of the electrolyte solution and the film thickness. Also, the anodized surface to be used for the electrophotographic photosensitive member in the present invention may be subjected to an electrolytic process and then to a sealing process. While the sealing process may be performed by using a hot-water treatment, stream treatment, or any of various sealers such as nickel acetate and fluoride nickel, it is preferable to perform the process by using nickel acetate, with which minute pores can be efficiently sealed. For a support to be obtained by anodization, it is particularly preferable to anodize the surface of an aluminum support under suitable conditions and provide a suitable photosensitive layer thereon.

<Undercoat Layer>

An undercoat layer may be provided between the support and the charge generation layer. Providing the undercoat layer can enhance the inter-layer adhesion and thus impart a charge injection prevention function.

The undercoat layer preferably contains a resin. Also, the undercoat layer may be formed as a cured film by polymerizing a composition containing a polymerizable functional group-containing monomer.

Examples of the resin include a polyester resin, polycarbonate resin, polyvinyl acetal resin, acrylic resin, epoxy resin, melamine resin, polyurethane resin, phenol resin, polyvinylphenol resin, alkyd resin, polyvinyl alcohol resin, polyethylene oxide resin, polypropylene oxide resin, polyamide resin, polyamic acid resin, polyimide resin, polyamide imide resin, cellulose resin, and so on.

Examples of the polymerizable functional group contained in the polymerizable functional group-containing monomer include an isocyanate group, blocked isocyanate group, methylol group, alkylation methylol group, epoxy group, metal alkoxide group, hydroxyl group, amino group, carboxyl group, thiol group, carboxylic acid anhydride structure, a carbon-carbon double bond, and so on.

Also, the undercoat layer may further contain an electron transport substance, a metal oxide, a metal, an electroconductive polymer, and so on for the purpose of enhancing electrical characteristics. Of these, it is preferable to use an electron transport substance or a metal oxide.

Particularly preferably, the undercoat layer contains a polyamide resin and titanium oxide particles. As the polyamide resin, a polyamide resin soluble in an alcohol-based solvent is preferable. For example, ternary (6-66-610) copolymerized polyamide, quaternary (6-66-610-12) copolymerized polyamide, N-methoxymethylated nylon, polymerized fatty acid-based polyamide, polymerized fatty acid-based polyamide block copolymer, copolymerized polyamide having a diamine component, and so on are preferably used.

The crystal structure of the titanium oxide particles is preferably rutile or anatase from the viewpoint of suppressing charge accumulation, and is more preferably rutile, which is weaker in photocatalytic activity. In the case of rutile, the rutile ratio is preferably 90% or more. The shape of the titanium oxide particles is preferably spherical, and their average primary particle size is preferably 10 nm or more and 100 nm or less and more preferably 30 nm or more and 60 nm or less from the viewpoint of suppressing charge accumulation and achieving uniform dispersion. The titanium oxide particles may be processed with a silane coupling agent from the viewpoint of achieving uniform dispersion.

The undercoat layer in the present invention may contain additives such as organic particles and a leveling agent as well as the above polyamide resin and titanium oxide particles for enhancing the film formability of the undercoat layer of the electrophotographic photosensitive member and for other similar purposes. However, the content of the additives in the undercoat layer is preferably 10% by mass or less relative to the total mass of the undercoat layer.

The average film thickness of the undercoat layer is preferably 0.5 μm or more and 3 μm or less. When the film thickness of the undercoat layer is 3 μm or less, it enhances the effect of suppressing charge accumulation. When the film thickness is less than 0.5 μm, the charging performance locally drops, which increases the likelihood of leakage.

The surface of a particularly preferable undercoat layer is such that its arithmetic average roughness Ra and average length of a roughness profile element Rsm measured according to JIS B0601:2001 satisfy Inequality (A) $Ra \leq 50$ nm and Inequality (B) $0.1 \leq Ra/Rsm \leq 0.5$.

A case where the charge generation substance contained in the later-described charge generation layer is hydroxygallium phthalocyanine will be described. When Ra of the surface of the undercoat layer is more than 50 nm or Ra/Rsm is less than 0.1, the scale of recessed portions of the undercoat layer is larger than the scale of hydroxygallium phthalocyanine pigment particles, so that the area of contact decreases, thereby slowing down the movement of generated charges. This leads to a failure to sufficiently reduce the curvature of the normalized curve expressed by Equation (E1), which is important in the present invention. Ra is particularly preferably 30 nm or less. When Ra/Rsm is more than 0.5, the recessed portions of the undercoat layer are deep so that hydroxygallium phthalocyanine pigment particles cannot enter the recessed portions, and a binder resin gets interposed between the undercoat layer and the hydroxygallium phthalocyanine pigment particles, thereby reducing the area of contact. This leads to a failure to sufficiently reduce the curvature of the normalized curve expressed by Equation (E1).

Now, a case where the charge generation substance contained in the later-described charge generation layer is titanyl phthalocyanine will be described. When Ra of the surface of the undercoat layer is more than 120 nm or Ra/Rsm is less than 0.1, the scale of recessed portions of the undercoat layer is larger than the scale of titanyl phthalocyanine pigment particles, so that the area of contact decreases, thereby slowing down the movement of generated charges. This leads to a failure to sufficiently reduce the curvature of the normalized curve expressed by Equation (E1), which is important in the present invention.

The undercoat layer can be formed by preparing an undercoat-layer coating liquid containing the above materials and a solvent, forming a coating film of this coating liquid on the underlying layer or the support, and drying and/or curing the coating film. Examples of the solvent used in the coating liquid include an alcohol-based solvent, ketone-based solvent, ether-based solvent, ester-based solvent, aromatic hydrocarbon-based solvent, and so on. Examples of a method of dispersing the titanium oxide particles in the undercoat-layer coating liquid include methods using ultrasonic dispersion, a paint shaker, a sand mill, a ball mill, or a liquid collision-type high-speed dispersing machine.

<Charge Generation Layer>

A charge generation layer is provided directly on the support or, if the undercoat layer is provided, directly on the undercoat layer. The charge generation layer in the present invention is obtained by dispersing a phthalocyanine pigment in the present invention as a charge generation substance and, if necessary, a binding resin in a solvent to prepare a charge-generation-layer coating liquid, forming a coating film of the charge-generation-layer coating liquid, and drying the coating film.

The charge-generation-layer coating liquid may be prepared by adding only the charge generation substance into the solvent, performing a dispersion process, and then adding the binding resin. Alternatively, the charge-generation-layer coating liquid may be prepared by adding the charge generation substance and the binding resin together into the solvent and then performing a dispersion process.

For the above dispersion, it is possible to use a dispersing machine such as a medium-type dispersing machine, such as a sand mill or a ball mill, a liquid collision-type dispersing machine, or an ultrasonic dispersing machine.

Examples of the binding resin used in the charge generation layer include resins (insulating resins) such as a polyvinyl butyral resin, polyvinyl acetal resin, polyarylate resin, polycarbonate resin, polyester resin, polyvinyl acetate resin, polysulfone resin, polystyrene resin, phenoxy resin, acrylic resin, phenoxy resin, polyacrylamide resin, polyvinyl pyridine resin, urethane resin, agarose resin, cellulose resin, casein resin, polyvinyl alcohol resin, polyvinylpyrrolidone resin, vinylidene chloride resin, acrylonitrile copolymer, and polyvinyl benzal resin. Moreover, organic photoconductive polymers such as poly-N-vinylcarbazol, polyvinylanthracene, and polyvinylpyrene are usable too. Also, only one kind of binding resin may be used, or two or more kinds may be used in combination in the form of a mixture or a copolymer.

Examples of the solvent used for the charge-generation-layer coating liquid include toluene, xylene, tetralin, chlorobenzene, dichloromethane, chloroform, trichloro ethylene, tetrachloroethylene, carbon tetrachloride, methyl acetate, ethyl acetate, propyl acetate, methyl formate, ethyl formate, acetone, methyl ethyl ketone, cyclohexanone, diethyl ether, dipropyl ether, propylene glycol monomethyl ether, dioxane, methylal, tetrahydrofuran, water, methanol, ethanol, N-propanol, isopropanol, butanol, methyl cellosolve, methoxypropanol, dimethylformamide, dimethylacetamide, dimethyl sulfoxide, and so on. Also, one kind of solvent may be used alone or a mixture of two or more kinds may be used.

The film thickness of the charge generation layer is preferably 0.16 μm or more. When laminated on the support or the undercoat layer, the charge generation layer completely covers the underlying layer. This enables smooth exchange of charges generated within the charge generation layer. Thus, setting the film thickness of the charge generation layer at 0.16 μm or more improves the ease in covering the underlying layer with the charge generation layer. Accordingly, the E-V bend of the curve of the normalized graph obtained from the E-V curve in the present invention is made sharper.

(Phthalocyanine Pigment)

In the present invention, phthalocyanine pigments are preferably usable as the charge generation substance. Of these, a hydroxygallium phthalocyanine pigment or titanyl phthalocyanine is preferably contained.

The hydroxygallium phthalocyanine pigment will now be discussed. The hydroxygallium phthalocyanine pigment used in the present invention may have an axial ligand or a substituent. In the present invention, the hydroxygallium phthalocyanine pigment is characterized in that it has crystal grains of a crystal form showing peaks at Bragg angles 2θ of 7.4°±0.3° and 28.2°±0.3° in an X-ray diffraction spectrum using CuKα radiation, and having a peak in the range of 30 nm to 50 nm in a crystal grain size distribution measured using small-angle X-ray scattering, and that the half width of the peak is 50 nm or less.

Further, the hydroxygallium phthalocyanine pigment more preferably has crystal grains containing the amide compound represented by Formula (A1) below within the grains. Examples of the amide compound represented by Formula (A1) include N-methylformamide, N-propylformamide, and N-vinylformamide.

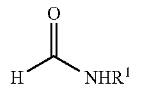

(A1)

(in Formula (A1), $R^1$ represents a methyl group, a propyl group, or a vinyl group.)

Also, the content of the amide compound represented by Formula (A1) contained in the crystal grains is preferably 0.1% by mass or more and 3.0% by mass or less and more preferably 0.1% by mass or more and 1.4% by mass or less relative to the content of the crystal grains. When the content of the amide compound is 0.1% by mass or more and 3.0% by mass or less, the crystal grains can be uniformly in an appropriate size.

The phthalocyanine pigment containing the amide compound represented by Formula (A1) within its crystal grains can be obtained by a process of performing crystal transformation on a phthalocyanine pigment obtained by acid pasting and the amide compound represented by Formula (A1) by a wet milling treatment.

In the case of using a dispersant in the milling treatment, the amount of this dispersant is preferably 10 to 50 times the phthalocyanine pigment in terms of mass. Also, examples of the solvent to be used include amide-based solvents such as N,N-dimethylformamide, N,N-dimethylacetamide, the compound represented by Formula (A1), N-methylacetamide, and N-methylpropionamide, halogen-based solvents such as chloroform, ether-based solvents such as tetrahydrofuran, sulfoxide-based solvents such as dimethyl sulfoxide, and so on. The amount of the solvent to be used is preferably 5 to 30 times the phthalocyanine pigment in terms of mass.

Also, the present inventors have found that, in the case of obtaining a phthalocyanine pigment of the crystal form used in the present invention by a crystal transformation process, using the amide compound represented by Formula (A1) as a solvent increases the time taken for the crystal form transformation. Specifically, in the case of using N-methylformamide as a solvent, the time taken for the crystal transformation is several times longer than that in the case of using N,N-dimethylformamide. By spending a long time for the crystal transformation, the crystal grains can be uniformly in a small size to a certain extent before the end of the crystal form transformation. This makes it easier to obtain the phthalocyanine pigment in the present invention.

Whether a hydroxygallium phthalocyanine pigment contains the amide compound represented by Formula (A1) within its crystal grains can be determined by analyzing data of 1H-NMR measurement of the obtained hydroxygallium phthalocyanine pigment. Also, via data analysis of the result of the 1H-NMR measurement, the content of the amide compound represented by Formula (A1) within the crystal grains can be determined. For example, in the case where a milling process is performed with a solvent in which the amide compound represented by Formula (A1) can be dissolved or a washing process is performed after the milling, the obtained hydroxygallium phthalocyanine pigment is subjected to 1H-NMR measurement. If the amide compound represented by Formula (A1) is detected by the measurement, it can be determined that the amide compound represented by Formula (A1) is contained within the crystals.

An oxytitanyl phthalocyanine pigment may be used as the charge generation substance. While oxytitanyl phthalocyanine pigments with various crystal forms are usable, it is preferable to use an oxytitanyl phthalocyanine pigment with a crystal form having characteristic peaks at Bragg angles (2θ±0.2°) of 9.0°, 14.2°, 23.9°, and 27.1° in CuKα characteristic X-ray diffraction.

Furthermore, a titanyl phthalocyanine pigment may be used as the charge generation substance. The titanyl phthalocyanine pigment preferably has crystal grains with a crystal form showing peaks at Bragg angles 2θ of 9.8°±0.3° and 27.1°±0.3° in an X-ray diffraction spectrum using CuKα radiation. Moreover, it is preferable that the titanyl phthalocyanine pigment have a peak in the range of 50 nm to 150 nm in a crystal grain size distribution measured using small-angle X-ray scattering and that the half width of the peak be 100 nm or less.

In the case of obtaining the phthalocyanine pigment in the present invention by a centrifugation process, it is necessary to measure the weight ratio of the phthalocyanine pigment and the binding resin in a mixed solution of the phthalocyanine pigment and the binding resin in order to control a ratio P of the volume of the charge generation substance to the entire volume of the charge generation layer. The weight ratio of the phthalocyanine pigment and the binding resin in the mixed solution can be determined by analyzing data of 1H-NMR measurement. For example, in the case of using a hydroxygallium phthalocyanine pigment as the phthalocyanine pigment and polyvinyl butyral as the binding resin, the weight ratio can be determined by comparing a peak originating from the hydroxygallium phthalocyanine pigment and a peak originating from the polyvinyl butyral in the data of the 1H-NMR measurement.

Powder X-ray diffraction measurement and 1H-NMR measurement of the phthalocyanine pigment contained in the electrophotographic photosensitive member in the present invention were performed under the following conditions.

(Powder X-ray Diffraction Measurement)

Measurement equipment used: X-ray diffraction apparatus RINT-TTRII manufactured by Rigaku Corporation X-ray tube: Cu X-ray wavelength: Kα1

Tube voltage: 50 KV

Tube current: 300 mA

Scanning method: 2θ scan

Scanning speed: 4.0°/min

Sampling intervals: 0.02°

Start angle 2θ: 5.0°

Stop angle 2θ: 35.0°

Goniometer: rotor horizontal goniometer (TTR-2)

Attachment: capillary sample turn table

Filter: none

Detector: scintillation counter

Incident monochromator: used

Slit: variable slit (parallel beam method)

Counter monochromator: not used

Divergence slit: open

Vertical divergence limiting slit: 10.00 mm

Scattering slit: open

Receiving slit: open (1H-Nmr Measurement)

Measurement equipment used: AVANCE III 500 manufactured by Bruker Corporation

Solvent: deuterated sulfuric acid (D2SO4)

Number of integrations: 2,000

<Charge Transport Layer>

A charge transport layer is provided on the charge generation layer.

The charge transport layer preferably contains a charge transport substance and a resin.

Examples of the charge transport substance include a polycyclic aromatic compound, heterocyclic compound, hydrazone compound, styryl compound, enamine compound, benzidine compound, triarylamine compound, resins having groups derived from these substances, and so on. Of these, the triarylamine compound and the benzidine compound are preferable.

The content of the charge transport substance in the charge transport layer is preferably 25% by mass or more and 70% by mass or less and more preferably 30% by mass or more and 55% by mass or less relative to the total mass of the charge transport layer.

Examples of the resin include a polyester resin, polycarbonate resin, acrylic resin, polystyrene resin, and so on. Of these, the polycarbonate resin and the polyester resin are preferable. A particularly preferable polyester resin is a polyarylate resin.

The content ratio (mass ratio) of the charge transport substance and the resin is preferably 4:10 to 20:10 and more preferably 5:10 to 12:10.

Also, the charge transport layer may contain additives such as an antioxidant, UV absorber, plasticizer, leveling agent, lubricity imparting agent, and wear resistance improver. Specifically, examples of these include a hindered phenol compound, hindered amine compound, sulfur compound, phosphorus compound, benzophenone compound, siloxane-modified resin, silicone oil, fluororesin particles, polystyrene resin particles, polyethylene resin particles, silica particles, alumina particles, boron nitride particles, and so on.

The average film thickness of the charge transport layer is preferably 5 μm or more and 50 μm or less, more preferably 8 μm or more and 40 μm or less, and particularly preferably 10 μm or more and 30 μm or less.

The charge transport layer can be formed by preparing a charge-transport-layer coating liquid containing the above materials and a solvent, forming a coating film of this coating liquid on the underlying layer, and drying the coating film. Examples of the solvent used in the coating liquid include an alcohol-based solvent, ketone-based solvent, ether-based solvent, ester-based solvent, aromatic hydrocarbon-based solvent, and so on. Of these solvents, the ether-based solvent or the aromatic hydrocarbon-based solvent is preferable.

<Single-Layered Photosensitive Layer>

A photosensitive member having a single-layered photosensitive layer can be formed by preparing a photosensitive-layer coating liquid containing a charge generation substance, a charge transport substance, a resin, and a solvent, forming a coating film of this coating liquid on the support, and drying the coating film. The charge generation substance, the charge transport substance, and the resin are similar to the exemplarily listed materials in the "electrophotographic photosensitive member having a laminated photosensitive layer" described above.

<Protective Layer>

In the present invention, a protective layer may be provided on the photosensitive layer. Providing the protective layer can improve durability.

The protective layer preferably contains electroconductive particles and/or a charge transport substance, and a resin.

Examples of the electroconductive particles include particles of metal oxides such as titanium oxide, zinc oxide, tin oxide, and indium oxide.

Examples of the charge transport substance include a polycyclic aromatic compound, heterocyclic compound, hydrazone compound, styryl compound, enamine compound, benzidine compound, triarylamine compound, resins having groups derived from these substances, and so on. Of these, the triarylamine compound and the benzidine compound are preferable.

Examples of the resin include a polyester resin, acrylic resin, phenoxy resin, polycarbonate resin, polystyrene resin, phenol resin, melamine resin, epoxy resin, and so on. Of these, the polycarbonate resin, the polyester resin, and the acrylic resin are preferable.

Also, the protective layer may be formed as a cured film by polymerizing a composition containing a polymerizable functional group-containing monomer. Examples of the reaction involved in this case include thermal polymerization reaction, photopolymerization reaction, irradiation polymerization reaction, and so on. Examples of the polymerizable functional group contained in the polymerizable functional group-containing monomer include an acryloyl group, a methacryloyl group, and so on. A material having a charge transport function may be used as the polymerizable functional group-containing monomer.

The protective layer may contain additives such as an antioxidant, UV absorber, plasticizer, leveling agent, lubricity imparting agent, and wear resistance improver. Specifically, examples of these include a hindered phenol compound, hindered amine compound, sulfur compound, phosphorus compound, benzophenone compound, siloxane-modified resin, silicone oil, fluororesin particles, polystyrene resin particles, polyethylene resin particles, silica particles, alumina particles, boron nitride particles, and so on.

The average film thickness of the protective layer is preferably 0.5 μm or more and 10 μm or less and more preferably 1 μm or more and 7 μm or less.

The protective layer can be formed by preparing a protective-layer coating liquid containing the above materials and a solvent, forming a coating film of this coating liquid on the underlying layer, and drying and/or curing the coating film. Examples of the solvent used in the coating liquid include an alcohol-based solvent, ketone-based solvent, ether-based solvent, sulfoxide-based solvent, ester-based solvent, and aromatic hydrocarbon-based solvent.

Process Cartridge and Electrophotographic Apparatus

Figure 2:
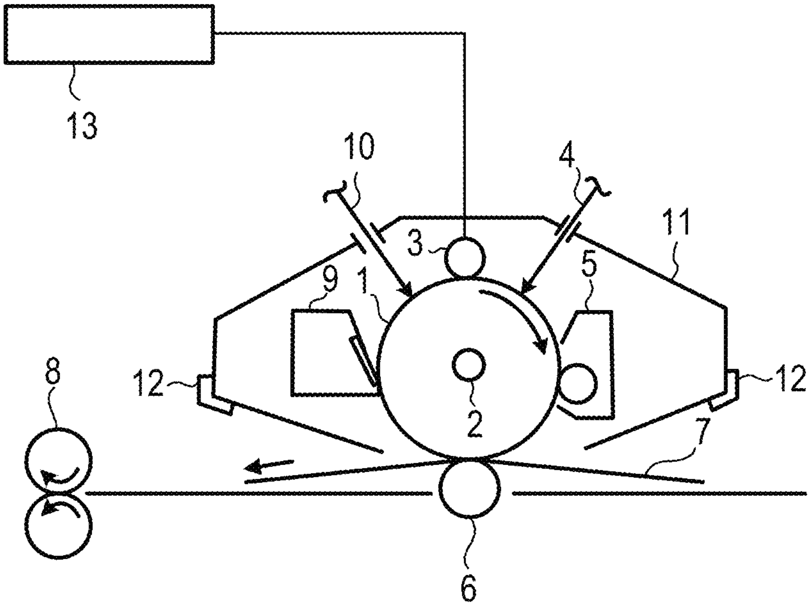
FIG. 2 is a diagram illustrating an example of a schematic configuration of an electrophotographic apparatus including a process cartridge having the electrophotographic photosensitive member according to the present invention.

FIG. 2 illustrates an example of a schematic configuration of an electrophotographic apparatus having a process cartridge including an electrophotographic photosensitive member. In FIG. 2, reference sign 1 denotes the electrophotographic photosensitive member, which has a cylindrical shape (drum shape) and is rotationally driven about a shaft 2 in the direction of the arrow therearound at a predetermined circumferential speed (process speed).

As the electrophotographic photosensitive member 1 is rotated, its surface is charged at a predetermined positive or negative potential by a charging unit 3 connected to a high-voltage power source 13 of the electrophotographic apparatus. Thereafter, the charged surface of the electrophotographic photosensitive member 1 is irradiated with image exposure light 4 from an exposure unit (not illustrated), so that an electrostatic latent image corresponding to target image information is formed. In the present invention, the image exposure light 4 is light output from the exposure unit formed of an LED array whose intensity is modulated according to a time-series electrical digital image signal representing the target image information.

The electrostatic latent image formed on the surface of the electrophotographic photosensitive member 1 is developed (regularly developed or reversely developed) with a toner contained in a development unit 5, so that a toner image is formed on the surface of the electrophotographic photosensitive member 1. The toner image formed on the surface of the electrophotographic photosensitive member 1 is transferred onto a transfer material 7 by a transfer unit 6. At this time, a bias voltage of the opposite polarity to the charge held by the toner is applied to the transfer unit 6 from a bias power source (not illustrated). When the transfer material 7 is paper, the transfer material 7 is taken out of a paper feed unit (not illustrated) and fed into the gap between the electrophotographic photosensitive member 1 and the transfer unit 6 in synchronization with the rotation of the electrophotographic photosensitive member 1.

The transfer material 7 with the toner image transferred thereonto from the electrophotographic photosensitive member 1 is separated from the surface of the electrophotographic photosensitive member 1 and then conveyed to a fixing unit 8 to undergo a process of fixing the toner image. As a result, the transfer material 7 is discharged to the outside of the electrophotographic apparatus as an image-formed product (print-out or copy). The surface of the electrophotographic photosensitive member 1 after transferring the toner image onto the transfer material 7 is cleaned by a cleaning unit 9 to remove the matter attached to the surface such as the residual toner (remaining toner after the transfer). With a recently developed cleaner-less system, the remaining toner after the transfer can be directly removed by a development device or the like. Subsequently, the surface of the electrophotographic photosensitive member 1 is subjected to charge removal with pre-exposure light 10 from a pre-exposure unit (not illustrated) and then repetitively used in image forming. Note that the pre-exposure unit is not necessarily required when the charging unit 3 is a contact charging unit using a charging roller or the like. In the present invention, two or more of the constituent elements such as the above-described electrophotographic photosensitive member 1, charging unit 3, development unit 5, and cleaning unit 9 can be housed in a container and supported together to form a process cartridge. Moreover, this process cartridge can be configured to be attachable and detachable to and from the body of the electrophotographic apparatus. For example, at least one selected from among the charging unit 3, the development unit 5, and the cleaning unit 9 can be supported together with the electrophotographic photosensitive member 1 in the form of a cartridge. Moreover, these elements can be configured as a process cartridge 11 attachable and detachable to and from the body of the electrophotographic apparatus by using a guide unit 12, such as rails, on the body of the electrophotographic apparatus.

EXAMPLES

The present invention will be described below in more details by using examples and comparative examples. The present invention is by no means limited to the following examples as long as the gist thereof is not exceeded. Note that "part(s)" in the following description of the examples is based on mass unless otherwise noted.

The film thickness of each of the layers of the electrophotographic photosensitive members in the examples and the comparative examples excluding the charge generation layer was obtained by a method using an eddy current-type film thickness meter (Fischerscope (trademark) manufactured by Fischer Instruments K.K.) or by a method involving conversion from the mass per unit area into relative density. The film thickness of the charge generation layer was obtained by pressing a spectrodensitometer (product name: X-Rite 504/508, manufactured by X-Rite, Incorporated) against the surface of the photosensitive member to measure the Macbeth density value, and converting it with a calibration curve obtained in advance from Macbeth density values and film thickness measurement values obtained through observation of a cross-sectional SEM image.

Preparation Example of Undercoat-Layer Coating Liquid 1

100 parts of rutile titanium oxide particles (average primary particle size: 50 nm, manufactured by TAYCA CORPORATION) and 500 parts of toluene were mixed by agitation, followed by addition of 3.0 parts of methyldimethoxysilane ("TSL8117" manufactured by Toshiba Silicone Co., Ltd.) and agitation for eight hours. Thereafter, the toluene was distilled away by reduced-pressure distillation, followed by drying at 120° C. for three hours. As a result, rutile titanium oxide particles surface treated with methyldimethoxysilane were obtained.

18 parts of the rutile titanium oxide particles surface treated with methyldimethoxysilane, 4.5 parts of N-methoxymethylated nylon (product name: Toresin EF-30T, manufactured by Nagase ChemteX Corporation), and 1.5 parts of a copolymerized nylon resin (product name:

AMILAN (trademark) CM8000, manufactured by Toray Industries, Inc.) were added into a mixed solvent containing 90 parts of methanol and 60 parts of 1-butanol to prepare a dispersion liquid. This dispersion liquid was subjected to a dispersion process for six hours in a vertical sand mill using glass beads with a diameter of 1.0 mm. The liquid subjected to this sand mill dispersion process was then subjected to another dispersion process for one hour with an ultrasonic dispersing machine (UT-205, manufactured by Sharp Corporation). As a result, an undercoat-layer coating liquid 1 was prepared. The output of the ultrasonic dispersing machine was 100%.

Preparation Example of Undercoat-Layer Coating Liquid 10

An undercoat-layer coating liquid 10 was prepared in the same manner as the undercoat-layer coating liquid 1 except that methyldimethoxysilane in the preparation example of the undercoat-layer coating liquid 1 was changed to vinyltrimethoxysilane (product name: KBM-1003, manufactured by Shin-Etsu Chemical Co., Ltd.).

Synthesis of Phthalocyanine Pigment

Synthesis Example 1

Under an atmosphere with a nitrogen flow, 5.46 parts of ortho-phthalonitrile and 45 parts of α-chloronaphthalene were introduced into a reactor, heated to 30° C., and maintained at this temperature. Then, 3.75 parts of gallium trichloride was introduced at this temperature (30° C.). The concentration of water in the mixed liquid at the time of the introduction was 150 ppm. The temperature was then raised to 200° C. Next, under an atmosphere with a nitrogen flow, the mixed liquid was reacted at a temperature of 200° C. for 4.5 hours and then cooled. The product was filtered when the temperature reached 150° C. The filtered product thus obtained was dispersed and washed using N,N-dimethylformamide at a temperature of 140° C. for two hours, and then filtered. The filtered product thus obtained was washed with methanol and dried. As a result, a chlorogallium phthalocyanine pigment was obtained at a yield of 71%.

Synthesis Example 2

4.65 parts of the chlorogallium phthalocyanine pigment obtained in Synthesis Example 1 was dissolved in 139.5 parts of concentrated sulfuric acid at a temperature of 10° C. and dripped into 620 parts of ice water under agitation to re-precipitate, followed by reduced-pressure filtration using a filter press. At this time, No. 5C (manufactured by ADVANTEC CO., LTD.) was used as the filter. The obtained wet cake (filtered product) was dispersed and washed with 2% ammonia water for 30 minutes, and filtered using a filter press. This was followed by repeating three times dispersion and washing of the obtained wet cake (filtered product) with ion-exchanged water and filtration of the resultant product using a filter press. Lastly, freeze drying was performed. As a result, a hydroxygallium phthalocyanine pigment (aqueous hydroxygallium phthalocyanine pigment) with a solid content of 23% was obtained at a yield of 97%.

Synthesis Example 3

6.6 kg of the hydroxygallium phthalocyanine pigment obtained in Synthesis Example 2 was dried as follows using a hyper dryer (product name: HD-06R, frequency (oscillatory frequency): 2455 MHz±15 MHz, manufactured by Biocon Japan Ltd.).

The above hydroxygallium phthalocyanine pigment was placed on a dedicated circular plastic tray in the same state of mass (an aqueous cake with a thickness of 4 cm or less) as it was taken out of the filter press. Far-infrared radiation was turned off, and the temperature of the dryer's inner wall was set at 50° C. During microwave irradiation, a vacuum pump and a leak valve were adjusted so as to achieve a vacuum of 4.0 to 10.0 kPa.

In the first step, the hydroxygallium phthalocyanine pigment was irradiated with a 4.8 kW microwave for 50 minutes. Thereafter, the microwave was temporarily turned off and the leak valve was temporarily closed to achieve a high vacuum of 2 kPa or less. At this point, the solid content of the hydroxygallium phthalocyanine pigment was 88%. In the second step, the leak valve was adjusted to bring the degree of vacuum (the pressure inside the dryer) to within the above set value range (4.0 to 10.0 kPa). Thereafter, the hydroxygallium phthalocyanine pigment was irradiated with a 1.2 kW microwave for five minutes. The microwave was then temporarily turned off and the leak valve was temporarily closed to achieve a high vacuum of 2 kPa or less. Moreover, this second step was repeated once (i.e., the step was performed twice in total). At this point, the solid content of the hydroxygallium phthalocyanine pigment was 98%. Further, in the third step, microwave irradiation was performed in the same manner as the second step except that the microwave output was changed to 0.8 kW from 1.2 kW in the second step. Moreover, this third step was repeated once (i.e., the step was performed twice in total). Furthermore, in the fourth step, the leak valve was adjusted to bring the degree of vacuum (the pressure inside the dryer) back to within the above set value range (4.0 to 10.0 kPa). Thereafter, the hydroxygallium phthalocyanine pigment was irradiated with a 0.4 kW microwave for three minutes. The microwave was then temporarily turned off and the leak valve was temporarily closed to achieve a high vacuum of 2 kPa or less. This fourth step was repeated seven times (i.e., the step was performed eight times in total). Thus, in a total of three hours, 1.52 kg of a hydroxygallium phthalocyanine pigment (crystal) with a water content of 1% or less was obtained.

Synthesis Example 4

In 100 g of α-chloronaphthalene, 5.0 g of o-phthalodinitrile and 2.0 g of titanium tetrachloride were heated at 200° C. for three hours under agitation and then cooled to 50° C., and the crystals precipitated were filtered out to obtain a paste of dichlorotitanium phthalocyanine. This paste was then washed with 100 mL of N,N-dimethylformamide heated to 100° C. under agitation, then washed with 100 mL of methanol at 60° C. twice, and filtered out. Furthermore, the obtained paste was agitated in 100 mL of deionized water at 80° C. for one hour and filtered out. As a result, 4.3 g of a blue titanyl phthalocyanine pigment was obtained.

Thereafter, this pigment was dissolved in a 30 mL of concentrated sulfuric acid and dripped into 300 mL of deionized water at 20° C. under agitation to re-precipitate, followed by filtration and thorough washing with water. Then, an amorphous titanyl phthalocyanine pigment was obtained. 4.0 g of this amorphous titanyl phthalocyanine pigment was suspended and agitated in 100 mL of methanol at room temperature (22° C.) for eight hours, and then filtered out and dried under reduced pressure. As a result, a low-crystallinity titanyl phthalocyanine pigment was obtained.

Synthesis Example 5

Under an atmosphere with a nitrogen flow, 10 g of gallium trichloride and 29.1 g of ortho-phthalonitrile were added to 100 mL of α-chloronaphthalene, followed by reaction for 24 hours at a temperature of 200° C. and then filtration of the resultant product. The obtained wet cake was heated and agitated using N,N-dimethylformamide at a temperature of 150° C. for 30 minutes, and then filtered. The filtered product thus obtained was washed with methanol and dried. As a result, a chlorogallium phthalocyanine pigment was obtained at a yield of 83%.

2 parts of the chlorogallium phthalocyanine pigment obtained by the above method was dissolved in 50 parts of concentrated sulfuric acid, agitated for two hours, and dripped into an ice-cooled mixed solution of 170 mL of distilled water and 66 mL of concentrated ammonia water to re-precipitate. The resultant product was thoroughly washed with distilled water and dried. As a result, 1.8 parts of a hydroxygallium phthalocyanine pigment was obtained.

Preparation Example of Charge-Generation-Layer Coating Liquid 1

1 part of the hydroxygallium phthalocyanine pigment obtained in Synthesis Example 3, 9 parts of N-methylformamide (product code: F0059, manufactured by Tokyo Chemical Industry Co., Ltd.), and 15 parts of glass beads with a diameter of 0.9 mm were subjected to a milling process using a sand mill (K-800, manufactured by Igarashi Machine Production Co., Ltd. (currently IMEX Co., Ltd.), disc diameter: 70 mm, number of discs: 5) for 70 hours with cooling water set at a temperature of 18° C. This milling process was performed under conditions of 400 revolutions of the disks per minute. The liquid thus processed was filtered to remove the glass beads. 30 parts of N-methylformamide was added to this liquid, followed by filtration and thorough washing of the matter caught on the filter with tetrahydrofuran. Subsequently, the caught matter thus washed was dried in vacuo. As a result, 0.45 part of a hydroxygallium phthalocyanine pigment was obtained.

The obtained pigment had peaks at Bragg angles 2θ of 7.5°±0.2°, 9.9°±0.2°, 16.2°±0.2°, 18.6°±0.2°, 25.2°±0.2°, and 28.3°±0.2° in an X-ray diffraction spectrum using CuKα radiation. A crystalline correlation length estimated from the peak at 7.5°±0.2°, which was the diffraction peak with the highest intensity in the range of 5° to 35°, was r=27 [nm]. Also, the content of the amide compound represented by Formula (A1) above (N-methylformamide) in the hydroxygallium phthalocyanine crystal grains estimated by $^1$H-NMR measurement was 1.5% by mass relative to the content of the hydroxygallium phthalocyanine.

Subsequently, 25 parts of the hydroxygallium phthalocyanine pigment obtained by the above processes, 5 parts of polyvinyl butyral (product name: S-LEC BX-1, manufactured by Sekisui Chemical Co., Ltd.), and 190 parts of cyclohexanone were charged into a centrifugation container and centrifugated using a high-speed cooling centrifuge (product name: himac CR22G, manufactured by Hitachi Koki Co., Ltd.) at a set temperature of 18° C. for 30 minutes. This process was performed using a rotor with the product name R14A (manufactured by Hitachi Koki Co., Ltd.) under conditions of 1,800 revolutions per minute with the minimum time used for acceleration and deceleration. The supernatant after this centrifugation was quickly collected into another centrifugation container. The solution thus obtained was centrifuged again in the same way as the above except for using a condition of 8,000 revolutions per minute. The supernatant after the centrifugation was removed, and the remaining solution was quickly collected into another sample bin. The weight ratio of the hydroxygallium phthalocyanine pigment and the polyvinyl butyral in the solution thus obtained was derived by $^1$H-NMR measurement. Moreover, the solid content of the obtained solution was derived by a method involving performing drying for 30 minutes with a dryer set at 150° C. and measuring the weight difference between before and after the drying.

Subsequently, polyvinyl butyral (product name: S-LEC BX-1, manufactured by Sekisui Chemical Co., Ltd.) and cyclohexanone were added to the solution obtained by the above centrifugation such that the weight ratio of the hydroxygallium phthalocyanine pigment, the polyvinyl butyral, and the cyclohexanone would be 20:10:190. 220 parts of this solution and 482 parts of glass beads with a diameter of 0.9 mm were subjected to a dispersion process using a sand mill (K-800, manufactured by Igarashi Machine Production Co., Ltd. (currently IMEX Co., Ltd.), disc diameter: 70 mm, number of discs: 5) for four hours with cooling water set at a temperature of 18° C. This milling process was performed under conditions of 1,800 revolutions of the disks per minute. The liquid thus processed was filtered to remove the glass beads. 444 parts of cyclohexanone and 634 parts of ethyl acetate were added to this dispersion liquid. As a result, a charge-generation-layer coating liquid 1 was prepared.

Measurement of the phthalocyanine pigment in the present invention by small-angle X-ray scattering was evaluated by following the procedure below.

Cyclohexanone was added to the prepared charge-generation-layer coating liquid 1, followed by dilution until the concentration of the charge generation substance dropped to 1 wt % to obtain a measurement sample.

Using a multi-purpose X-ray diffraction apparatus SmartLab manufactured by Rigaku Corporation, small-angle X-ray scattering measurement (X-ray wavelength: 0.154 nm) was performed to obtain a scattering profile.

The scattering profile obtained by the measurement was analyzed using particle size analysis software NANO-Solver to obtain a particle size distribution. Note that the particle shape was assumed to be spherical.

The measurement result indicted that there was a peak at the 38 nm position in a crystallite size distribution measured using the small-angle X-ray scattering of the obtained pigment, and the half width of the peak was 38 nm.

Preparation Example of Charge-Generation-Layer Coating Liquid 10

0.5 part of the titanyl phthalocyanine pigment obtained in Synthesis Example 4, 10 parts of tetrahydrofuran, and 15 parts of glass beads with a diameter of 0.9 mm were subjected to a milling process using a sand mill (K-800, manufactured by Igarashi Machine Production Co., Ltd. (currently IMEX Co., Ltd.), disc diameter: 70 mm, number of discs: 5) for 48 hours with cooling water set at a temperature of 18° C. This milling process was performed under conditions of 500 revolutions of the disks per minute. The liquid thus processed was filtered with a filter (product number: N-NO.125T, pore size: 133 μm, manufactured by NBC Meshtec Inc.) to remove the glass beads. 30 parts of tetrahydrofuran was added to this liquid, followed by filtration and thorough washing of the matter caught on the filter with methanol and water. Subsequently, the caught matter thus washed was dried in vacuo. As a result, 0.46 part of a titanyl phthalocyanine pigment was obtained. The obtained pigment had a peak at a Bragg angle 2θ° of 27.2°±0.2° in an X-ray diffraction spectrum using CuKα radiation.

Subsequently, 12 parts of the titanyl phthalocyanine pigment obtained by the above milling process, 10 parts of polyvinyl butyral (product name: S-LEC BX-1, manufactured by Sekisui Chemical Co., Ltd.), 139 parts of cyclohexanone, and 354 parts of glass beads with a diameter of 0.9 mm were subjected to a dispersion process using a sand mill (K-800, manufactured by Igarashi Machine Production Co., Ltd. (currently IMEX Co., Ltd.), disc diameter: 70 mm, number of discs: 5) for four hours with cooling water set at a temperature of 18° C. This milling process was performed under conditions of 1,800 revolutions of the disks per minute. The liquid thus processed was filtered to remove the glass beads. 326 parts of cyclohexanone and 465 parts of ethyl acetate were added to this dispersion liquid. As a result, a charge-generation-layer coating liquid 10 was prepared. There was a peak at the 70 nm position in a crystallite size distribution measured using the small-angle X-ray scattering of the obtained pigment, and the half width of the peak was 90 nm.

Support Manufacturing Example S1

A cutting tool was fixed to a lathe while its cutting edge adjusted to achieve a cutting pitch of 100 μm was pressed against one end portion of a cylindrical aluminum piece measuring 30 mm in diameter and 260.5 mm in length to a depth of 1.8 μm. Thereafter, the cylindrical aluminum piece was cut by rotating the cylindrical aluminum piece while also moving the cutting edge of the cutting tool to the other end portion of the cylindrical aluminum piece at a feed speed of 200 μm per rotation of the cylindrical aluminum piece. As a result, a support S1 was obtained.

Manufacturing of Anodized Support A1

An aluminum cylinder (JIS-A3003, aluminum alloy) measuring 30 mm in diameter and 260.5 mm in length which was manufactured by a manufacturing method including an extrusion step and a drawing step was prepared. In a washing step, this cylinder was subjected sequentially to a degreasing process, a one-minute etching process with a 2 wt % sodium hydroxide solution, a neutralization process, and pure water washing. Then, anodization was performed in a 10 wt % sulfuric acid solution for 40 minutes at a current density of 1.0 A/$dm^2$ to form an anodized film on the surface of the cylinder. Thereafter, the cylinder was washed with water and then immersed in a 1 wt % nickel acetate solution at 80° C. for 15 minutes to perform a sealing process. Furthermore, pure water washing and a drying process were performed. As a result, an anodized support A1 was obtained.

Manufacturing of Anodized Support A2

The support S1 was prepared. In a washing step, this cylinder was subjected sequentially to a degreasing process, a one-minute etching process with a 2 wt % sodium hydroxide solution, a neutralization process, and pure water washing. Then, anodization was performed in a 10 wt % sulfuric acid solution for 20 minutes at a current density of 1.0 A/$dm^2$ to form an anodized film on the surface of the cylinder. Thereafter, the cylinder was washed with water and then immersed in a 1 wt % nickel acetate solution at 80° C. for 15 minutes to perform a sealing process. Furthermore, pure water washing and a drying process were performed. As a result, an anodized support A2 was obtained.

Photosensitive Member Manufacturing Example 1

<Support>

An aluminum cylinder measuring 30 mm in diameter and 260.5 mm in length which was manufactured by a manufacturing method including an extrusion step and a drawing step was used as the support 1 (cylindrical support).

<Electroconductive Layer>

Anatase titanium oxide with an average primary particle size of 200 nm was used as a substrate, and a titanium niobium sulfuric acid solution containing 33.7 parts of titanium in terms of $TiO_2$ and 2.9 parts of niobium in terms of $Nb_2O_5$ was prepared. 100 parts of the substrate was dispersed in pure water to prepare 1000 parts of a suspension, which was heated to 60° C. The titanium niobium sulfuric acid solution and 10 mol/L sodium hydroxide were simultaneously dripped for three hours such that the pH of the suspension would be 2 to 3. After dripping the entire amounts, the pH was adjusted to near neutral, and a polyacrylamide-based flocculant was added to settle the solids. The supernatant was removed, followed by filtration, washing, and drying at 110° C. As a result, an intermediate containing 0.1 wt % (in terms of C) of organic matter derived from the flocculant was obtained. This intermediate was calcined in nitrogen at 750° C. for one hour and then calcined in air at 450° C. to prepare titanium oxide particles. The obtained particles had an average particle size (average primary particle size) of 220 nm according to the above-mentioned particle size measurement method using a scanning electron microscope.

Subsequently, 50 parts of a phenol resin (monomer/oligomer of a phenol resin) (product name: PLYOPHEN J-325, manufactured by DIC Corporation, the resin's solid content: 60%, density after curing: 1.3 g/$cm^2$) as a binding material was dissolved in 35 parts of 1-methoxy-2-propanol as a solvent to obtain a solution.

60 parts of titanium oxide particles 1 was added to this solution to prepare a dispersion medium. This was charged into a vertical sand mill using 120 parts of glass beads with an average particle size of 1.0 mm and subjected to a dispersion process under conditions of a dispersion temperature of 23±3° C. and a number of revolutions of 1500 rpm (circumferential speed: 5.5 m/s) for four hours to obtain a dispersion liquid. The glass beads were removed from this dispersion liquid with mesh. 0.01 part of silicone oil (product name: SH28 PAINT ADDITIVE, manufactured by Dow Corning Toray Co., Ltd.) as a leveling agent, and 8 parts of silicone resin particles (product name: KMP-590, manufactured by Shin-Etsu Chemical Co., Ltd., average particle size: 2 μm, density: 1.3 g/$cm^3$) as a surface roughness imparting material were added to the dispersion liquid from which the glass beads were removed, followed by agitation and filtration under pressure with a PTFE filter paper (product name: PF060, manufactured by Advantec Toyo Kaisha, Ltd.). As a result, an electroconductive-layer coating liquid was prepared.

The electroconductive-layer coating liquid thus prepared was applied to the above-described support by immersion, and the coating film was heated at 150° C. for 20 minutes to be cured. As a result, an electroconductive layer with a film thickness of 25 μm was formed.

<Undercoat Layer>

An undercoat-layer coating liquid prepared by following the preparation example of the undercoat-layer coating liquid 10 was applied to the above electroconductive layer by immersion to form a coating film. The coating film was heated at a temperature of 100° C. for 10 minutes to be dried. As a result, an undercoat layer with a film thickness of 2 μm was formed. The arithmetic average roughness Ra and the average length of a roughness profile element Rsm of the obtained undercoat layer in JIS B0601:2001 were measured, and Ra/Rsm was calculated. Ra and Rsm were measured to be 20 nm and 110 nm, respectively, Ra/Rsm was calculated to be 0.18.

Note that the surface roughness of the undercoat layer in the present invention was evaluated by following the procedure below.

The prepared charge transport layer of the photosensitive drum was dissolved with toluene and dried to expose the surface of the charge generation layer. Then, the exposed charge generation layer of the photosensitive drum was dissolved with cyclohexanone and dried to exposed the surface of the undercoat layer. Moreover, a piece of the photosensitive member after exposing the surface of the undercoat layer was cut out in a square shape measuring approximately 5 mm on each side to prepare a measurement sample.

Height information of a 500 nm square region on the surface of the undercoat layer was obtained using a scanning probe microscope JSPM-5200 manufactured by JEOL Ltd. For the measurement, a cantilever NCR manufactured by NanoWorld AG was used to scan the surface in tapping mode to obtain the height information. From the obtained height information, the arithmetic average roughness Ra and the average length of a roughness profile element Rsm in JIS B0601:2001 and Ra/Rsm were calculated.

<Charge Generation Layer>

A charge-generation-layer coating liquid prepared by following the preparation example of the charge-generation-layer coating liquid 1 was applied to the above undercoat layer by immersion to form a coating film. The coating film was heated at a temperature of 100° C. for 10 minutes to be dried. As a result, a charge generation layer with a film thickness of 0.2 μm was formed.

<Charge Transport Layer>

As the charge transport substance, 5 parts of the triarylamine compound represented by the following formula,

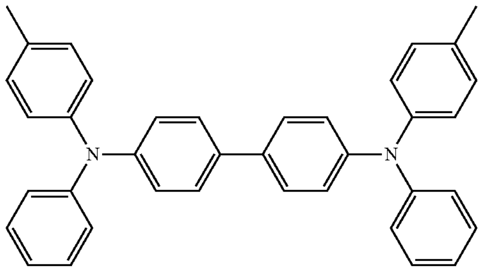 [SMILES: Cc1ccc(N(c2ccccc2)c2ccc(-c3ccc(N(c4ccccc4)c4ccc(C)cc4)cc3)cc2)cc1]

5 parts of the triarylamine compound represented by the following formula,

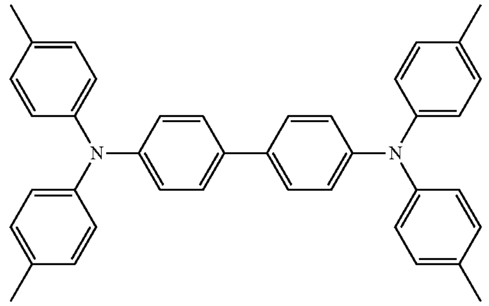 [SMILES: Cc1ccc(N(c2ccc(C)cc2)c2ccc(-c3ccc(N(c4ccc(C)cc4)c4ccc(C)cc4)cc3)cc2)cc1]

and 10 parts of a polycarbonate (product name: Iupilon Z-400, manufactured by Mitsubishi Engineering-Plastics Corporation) were dissolved in a mixed solvent containing 25 parts of ortho-xylene, 25 parts of methyl benzoate, and 25 parts of dimethoxy methane to prepare a charge-transport-layer coating liquid.

The charge-transport-layer coating liquid thus prepared was applied to the above-described charge generation layer by immersion, and the coating film was heated at a temperature of 120° C. for 30 minutes to be dried. As a result, a charge transport layer with a film thickness of 17 μm was formed.

The electrophotographic photosensitive member 1 was obtained in this manner.

Photosensitive Member Manufacturing Example 2

An electrophotographic photosensitive member 2 was manufactured in the same manner as in Photosensitive Member Manufacturing Example 1 except that the undercoat-layer coating liquid 1 and the charge-generation-layer coating liquid 2 were used in lieu of the undercoat-layer coating liquid 10 and the charge-generation-layer coating liquid 1 in Photosensitive Member Manufacturing Example 1. The arithmetic average roughness Ra of the obtained undercoat layer in JIS B0601:2001 was 100 nm, Rsm was 220 nm, and Ra/Rsm was 0.45.

Photosensitive Member Manufacturing Example 3

An electrophotographic photosensitive member 3 was manufactured in the same manner as in Photosensitive Member Manufacturing Example 2 except that an coating liquid obtained by dissolving 4.5 parts of N-methoxymethylated nylon (product name: Toresin EF-30T, manufactured by Nagase ChemteX Corporation) and 1.5 parts of a copolymerized nylon resin (product name: AMILAN (trademark) CM8000, manufactured by Toray Industries, Inc.) in 90 parts of methanol and 60 parts of 1-butanol was used in lieu of the undercoat-layer coating liquid 1 in Photosensitive Member Manufacturing Example 2 to form a 0.8 μm thick undercoat layer.

Photosensitive Member Manufacturing Example 4

An electrophotographic photosensitive member 4 was manufactured in the same manner as in Photosensitive Member Manufacturing Example 1 except that an coating liquid obtained by dissolving 4.5 parts of N-methoxymethylated nylon (product name: Toresin EF-30T, manufactured by Nagase ChemteX Corporation) and 1.5 parts of a copolymerized nylon resin (product name: AMILAN (trademark) CM8000, manufactured by Toray Industries, Inc.) in 90 parts of methanol and 60 parts of 1-butanol was used in lieu of the undercoat-layer coating liquid 10 in Photosensitive Member Manufacturing Example 1 to form a 0.8 μm thick undercoat layer.

Photosensitive Member Manufacturing Example 5

An electrophotographic photosensitive member 5 was manufactured in the same manner as in Photosensitive Member Manufacturing Example 1 except that an anodized support A1 coated with no electroconductive layer or undercoat layer was used as the support in lieu of the support 1 in Photosensitive Member Manufacturing Example 1.

Photosensitive Member Manufacturing Example 6

An electrophotographic photosensitive member 6 was manufactured in the same manner as in Photosensitive Member Manufacturing Example 1 except that an anodized support A2 coated with no electroconductive layer or undercoat layer was used as the support in lieu of the support 1 in Photosensitive Member Manufacturing Example 1.

Photosensitive Member Manufacturing Example 7

An electrophotographic photosensitive member 7 was manufactured in the same manner as in Photosensitive Member Manufacturing Example 2 except that an anodized support A1 coated with no electroconductive layer or undercoat layer was used as the support in lieu of the support 1 in Photosensitive Member Manufacturing Example 2.

Photosensitive Member Manufacturing Example 8

An electrophotographic photosensitive member 8 was manufactured in the same manner as in Photosensitive Member Manufacturing Example 1 except that a cut support S1 coated with no electroconductive layer was used as the support in lieu of the support 1 in Photosensitive Member Manufacturing Example 1.

TABLE 1

| | Photosensitive member | Minimum value of normalized radius of curvature R | Light quantity Emin with minimum curvature Emin (μJ/cm$^2$) | Multiplicand for latent-image light quantity (×Emin) | One dot Image quality | Ghost image quality |
|---|---|---|---|---|---|---|
| Example 1 | Electrophotographic photosensitive member 1 | 0.188 | 0.506 | 0.80 | B | A |
| Example 2 | Electrophotographic photosensitive member 1 | 0.188 | 0.506 | 0.90 | A | A |
| Example 3 | Electrophotographic photosensitive member 1 | 0.188 | 0.506 | 1.00 | A | A |
| Example 4 | Electrophotographic photosensitive member 1 | 0.188 | 0.506 | 1.10 | A | B |
| Example 5 | Electrophotographic photosensitive member 2 | 0.204 | 0.381 | 0.80 | B | A |
| Example 6 | Electrophotographic photosensitive member 2 | 0.204 | 0.381 | 0.90 | A | A |
| Example 7 | Electrophotographic photosensitive member 2 | 0.204 | 0.381 | 1.00 | A | A |
| Example 8 | Electrophotographic photosensitive member 2 | 0.204 | 0.381 | 1.10 | A | B |
| Example 9 | Electrophotographic photosensitive member 3 | 0.238 | 0.435 | 0.80 | C | B |
| Example 10 | Electrophotographic photosensitive member 3 | 0.238 | 0.435 | 0.90 | A | B |
| Example 11 | Electrophotographic photosensitive member 3 | 0.238 | 0.435 | 1.00 | B | A |
| Example 12 | Electrophotographic photosensitive member 3 | 0.238 | 0.435 | 1.10 | B | C |
| Example 13 | Electrophotographic photosensitive member 4 | 0.210 | 0.501 | 0.80 | B | B |
| Example 14 | Electrophotographic photosensitive member 4 | 0.210 | 0.501 | 0.90 | A | B |
| Example 15 | Electrophotographic photosensitive member 4 | 0.210 | 0.501 | 1.00 | B | A |
| Example 16 | Electrophotographic photosensitive member 4 | 0.210 | 0.501 | 1.10 | B | B |
| Example 17 | Electrophotographic photosensitive member 5 | 0.240 | 0.660 | 0.80 | C | B |
| Example 18 | Electrophotographic photosensitive member 5 | 0.240 | 0.660 | 0.90 | A | B |
| Example 19 | Electrophotographic photosensitive member 5 | 0.240 | 0.660 | 1.00 | B | A |
| Example 20 | Electrophotographic photosensitive member 5 | 0.240 | 0.660 | 1.10 | B | C |
| Example 21 | Electrophotographic photosensitive member 6 | 0.234 | 0.657 | 0.80 | C | B |
| Example 22 | Electrophotographic photosensitive member 6 | 0.234 | 0.657 | 0.90 | A | B |

TABLE 1-continued

| | Photosensitive member | Minimum value of normalized radius of curvature R | Light quantity Emin with minimum curvature Emin ($\mu J/cm^2$) | Multiplicand for latent-image light quantity (×Emin) | One dot Image quality | Ghost image quality |
|---|---|---|---|---|---|---|
| Example 23 | Electrophotographic photosensitive member 6 | 0.234 | 0.657 | 1.00 | B | A |
| Example 24 | Electrophotographic photosensitive member 6 | 0.234 | 0.657 | 1.10 | B | C |
| Example 25 | Electrophotographic photosensitive member 7 | 0.237 | 0.610 | 0.80 | C | B |
| Example 26 | Electrophotographic photosensitive member 7 | 0.237 | 0.610 | 0.90 | A | B |
| Example 27 | Electrophotographic photosensitive member 7 | 0.237 | 0.610 | 1.00 | B | A |
| Example 28 | Electrophotographic photosensitive member 7 | 0.237 | 0.610 | 1.10 | B | C |
| Example 29 | Electrophotographic photosensitive member 8 | 0.181 | 0.483 | 0.80 | B | A |
| Example 30 | Electrophotographic photosensitive member 8 | 0.181 | 0.483 | 0.90 | A | A |
| Example 31 | Electrophotographic photosensitive member 8 | 0.181 | 0.483 | 1.00 | A | A |
| Example 32 | Electrophotographic photosensitive member 8 | 0.181 | 0.483 | 1.10 | A | B |

Evaluation of Electrophotographic Photosensitive Members

The above examples and comparative examples were evaluated as follows. The results are shown in Tables 1 and 2.

<Printed Image (One-Dot Image) Evaluation of Electrophotographic Photosensitive Members>

A laser beam printer manufactured by Hewlett-Packard Company (product name: Color LaserJet Enterprise M652) was modified and used as an electrophotographic apparatus for the printed image evaluation. The modification was done by changing the laser exposure system with an LED array. The focal length of the LED array from the photosensitive member surface was adjusted such that the spot diameter of light to be applied from each single LED element would be 60 μm on average. Also, the LED array was actuated with varying charge conditions and LED exposure dose. The electrophotographic photosensitive members 1 to 8 were each mounted to a black process cartridge, which was attached to a station for the black process cartridge, and an image was output. Also, the voltage to be applied to the charging member was adjusted such that a dark-portion potential Vd would be −500 V, and the light-portion potential Vl was adjusted as appropriate to form a latent image with a latent-image light quantity listed in Table 1 or 2 (adjusted as the average of light quantities from the LEDs of the LED array). For example, in Example 1, the electrophotographic photosensitive member 1 was used as the photosensitive member, E min was 0.506 $\mu J/cm^2$, and the latent-image exposure dose was E min×0.80. In the other examples and comparative examples too, images were formed with electrophotographic photosensitive members and latent-image light quantities listed in Tables 1 and 2.

The one-dot image evaluation of the printed images was performed by performing exposure at a resolution of 600 dpi and outputting an image pattern with one-dot spacing per exposure dot (isolated dot pattern) in a normal temperature and normal humidity (23° C. and 50% RH) environment, and observing the shapes of one-dot images in the output image with an optical microscope. The single dots at 10 spots were observed with the microscope, and the sizes of these one-dot images were calculated. The observed single dots at the 10 spots were expressed as A when the size fluctuation (the ratio between the largest value and the smallest value) was 5% or less, B when the size fluctuation was 10% or less, C when the size fluctuation was 15% or less, and D when the size fluctuation was 20% or more.

<Ghost Image Evaluation of Electrophotographic Photosensitive Members>

Figure 7A:
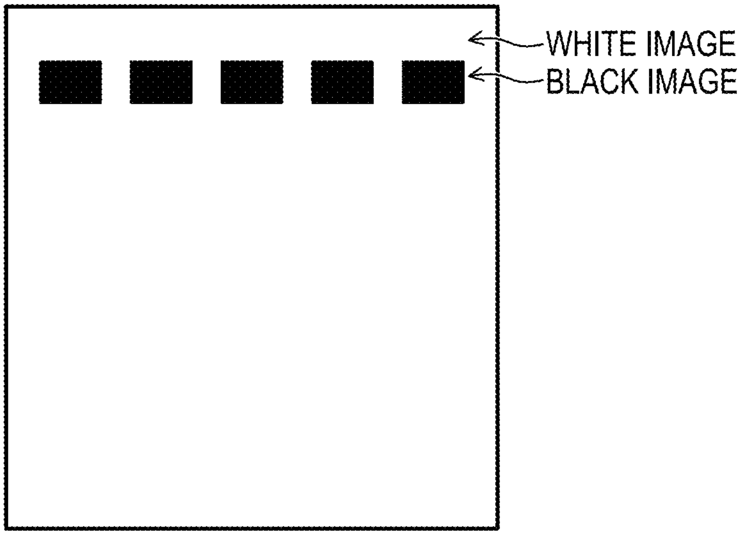
FIG. 7A is a diagram illustrating an input image used for ghost image evaluation.
Figure 7B:
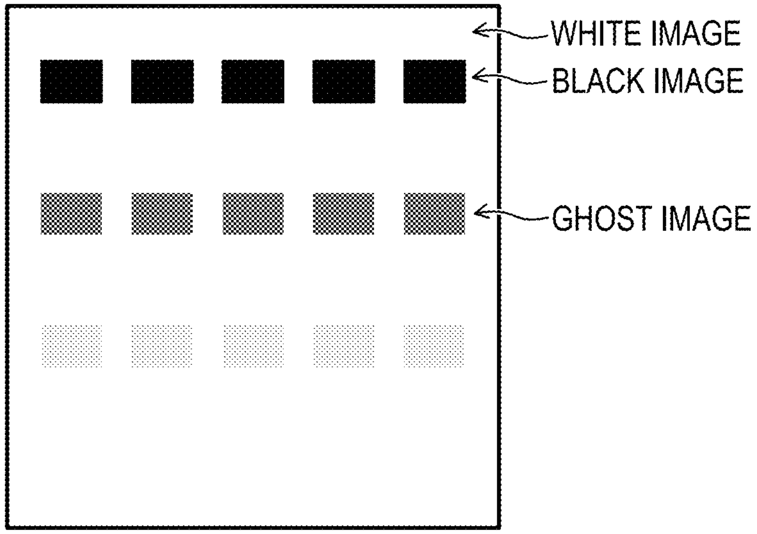
FIG. 7B is a diagram illustrating a typical output image.

A modified apparatus was prepared in the same manner as the printed image evaluation, and a ghost image evaluation was performed by printing the evaluation chart illustrated in FIGS. 7A and 7B (dot knight-jump pattern) in lieu of one-dot images. FIG. 7A illustrates an input image. FIG. 7B is an example of an output image, illustrating a schematic diagram of a case where ghost images have been output and appeared based on the input image. The input image (FIG. 7A) is formed of some black images in a white image as a background. The output image (FIG. 7B) represents an example where ghost images have appeared in addition to the white image and the black images.

In printing for the ghost evaluation, the difference in image density between halftone images of one-dot knight-jump patterns and the ghost portions was measured with a spectrodensitometer (product name: X-Rite 504/508, manufactured by X-Rite, Incorporated). The image evaluation was done by evaluating the ghost at the center position in the image forming region. Image density was measured for each of the halftone images and the ghost portions generated in the printing for the ghost evaluation. The difference in image density between the halftone image regions and the ghost portions was defined as "ghost-image density difference". The smaller the value of the ghost-image density difference, the higher the effect of suppressing the appearance of ghost images. The ghost evaluation was done according to the following criteria. A indicates that the ghost-image density difference was less than 0.01, B indicates that the ghost-image density difference was 0.01 or more and less than 0.02, C indicates that the ghost-image density difference was 0.02 or more and less than 0.04, and D indicates that the ghost image density difference was 0.04 or more.

TABLE 2

| | Photosensitive member | Minimum value of normalized radius of curvature R | Light quantity Emin with minimum curvature Emin ($\mu J/cm^2$) | Multiplicand for latent-image light quantity (×Emin) | One dot Image quality | Ghost image quality |
|---|---|---|---|---|---|---|
| Comparative Example 1 | Electrophotographic photosensitive member 7 | 0.237 | 0.61 | 0.7 | D | B |
| Comparative Example 2 | Electrophotographic photosensitive member 7 | 0.237 | 0.61 | 1.2 | A | D |
| Comparative Example 3 | Electrophotographic photosensitive member 9 | 0.250 | 0.58 | 0.8 | D | C |
| Comparative Example 4 | Electrophotographic photosensitive member 9 | 0.250 | 0.58 | 1.1 | C | D |

It is understood from the above that one-dot image fluctuation and ghost images can both be addressed by using the photosensitive member in the present invention, with which the normalized radius of curvature is 0.24 or less, and performing image forming with a light quantity of 0.8×E min or more and 1.1×E min or less, where E min represents a latent-image light quantity with which the normalized radius of curvature has the minimum value.

That is, according to the present invention, it is possible to provide an electrophotographic apparatus using an LED array that remedies both one-dot image unevenness due to the light quantity fluctuation among the LED array's elements and generation of ghost images.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-130217, filed Aug. 6, 2021, which is hereby incorporated by reference herein in its entirety.

What is claimed is:

1. An electrophotographic apparatus, comprising:

an electrophotographic photosensitive member configured to bear a toner image for forming an image on a recording material and comprising a charge generation layer;

the charge generating layer comprising a charge generating substance comprising a titanyl phthalocyanine pigment or a hydroxygallium phthalocyanine pigment;

a charging unit configured to charge the electrophotographic photosensitive member; and an exposure unit configured to expose a surface of the charged electrophotographic photosensitive member;

the exposure unit comprising a light emitting diode array including a plurality of light emitting diode elements, wherein when a graph with a horizontal axis representing $I_{exp}$ and a vertical axis representing $V_{exp}$ obtained by repeating (1) to (4)

(1) setting a surface potential of the electrophotographic photosensitive member at 0 V, (2) charging the electrophotographic photosensitive member for 0.005 second so that an absolute value of the surface potential of the electrophotographic photosensitive member becomes 500 V, (3) exposing the charged electrophotographic photosensitive member to light having a wavelength of 805 nm and a light quantity of $I_{exp}$ [$\mu J/cm^2$] 0.02 second after a start of the charging, and (4) determining the absolute value of the surface potential of the electrophotographic photosensitive member measured 0.06 second after the start of the charging as $V_{exp}$ [V]

at a temperature of 23.5° C. and a relative humidity of 50% RH while varying $I_{exp}$ from 0.000 to 1.000 $\mu J/cm^2$ at intervals of 0.001 $\mu J/cm^2$ is normalized as a normalized graph with a horizontal axis x and a vertical axis y such that, with a light quantity at $V_{exp}$=250 V in the graph being $I_{1/2}$ [$\mu J/cm^2$], a horizontal axis coordinate x corresponding to $I_{exp}=10\cdot I_{1/2}$ [$\mu J/cm^2$] is x=1, and a horizontal axis coordinate x corresponding to $I_{exp}$=0 [$\mu J/cm^2$] is x=0, and a vertical axis coordinate y corresponding to $V_{exp}$=500 V is y=1 and a vertical axis coordinate y corresponding to $V_{exp}$ [V] at $I_{exp}=10\cdot I_{1/2}$ [$\mu J/cm^2$] is y=0, in the normalized graph, a minimum value of a normalized radius of curvature R calculated from the following Equation (E1) is 0.24 or less, $$R = \frac{\left[1 + \left(\frac{dy}{dx}\right)^2\right]^{3/2}}{\left|\frac{d^2y}{dx^2}\right|}, \tag{E1}$$

and given that $I_{exp}$ corresponding to x at which the normalized radius of curvature R is the minimum value is E min [$\mu J/cm^2$], the light emitting diode array is configured to expose the charged electrophotographic photosensitive member to a quantity of light whose average light quantity satisfies 0.8×E min or more and 1.1×E min or less, the titanyl phthalocyanine pigment has crystal grains with a crystal form showing peaks at Bragg angles 2θ of 9.8°±0.3° and 27.1°±0.3° in an X-ray diffraction spectrum using CuKα radiation, and has a peak in a range of 50 to 150 nm in a crystal grain size distribution measured using small-angle X-ray scattering, and a half width of the peak is 100 nm or less, and the hydroxygallium phthalocyanine pigment has crystal grains with a crystal form showing peaks at Bragg angles 2θ of 7.4°±0.3° and 28.2°±0.3° in an X-ray diffraction spectrum using CuKα radiation, and has a peak in a range of 30 to 50 nm in a crystal grain size distribution measured using small-angle X-ray scattering and a half width of the peak is 50 nm or less.

2. The electrophotographic apparatus according to claim 1, wherein the minimum value of the normalized radius of curvature R is 0.21 or less.

3. The electrophotographic apparatus according to claim 2, wherein the light emitting diode array is configured to expose the charged electrophotographic photosensitive member to a quantity of light whose average light quantity satisfies 0.9×E min or more and 1.0×E min or less.

4. The electrophotographic apparatus according to claim 1, wherein the electrophotographic photosensitive member comprises, in this order:

a support;

an undercoat layer comprising a polyamide resin and a metal oxide particle;

the charge generation layer; and a charge transport layer containing a charge transport substance.

5. The electrophotographic apparatus according to claim 1, wherein the electrophotographic photosensitive member comprises an undercoat layer having a surface with an arithmetic average roughness Ra and an average length of roughness profile element Rsm which satisfy Ra≤50 nm and 0.1≤Ra/Rsm≤0.5 according to JIS B0601:2001.

6. The electrophotographic apparatus according to claim 1, wherein the charge generation substance comprises the titanyl phthalocyanine pigment.

7. The electrophotographic apparatus according to claim 1, wherein the charge generation substance comprises the hydroxygallium phthalocyanine pigment.

8. The electrophotographic apparatus according to claim 1, wherein the charge generation layer has a film thickness of 0.16 μm or more.

* * * * *